(12) United States Patent
Ooi et al.

(10) Patent No.: US 7,564,504 B2
(45) Date of Patent: Jul. 21, 2009

(54) PHASE PLATE AND AN OPTICAL DATA RECORDING/REPRODUCING DEVICE

(75) Inventors: Yoshiharu Ooi, Chiyoda-ku (JP); Ryota Murakami, Koriyama (JP); Hiromasa Sato, Koriyama (JP); Takuji Nomura, Koriyama (JP); Masahiro Murakawa, Koriyama (JP); Yoshiyuki Miyake, Chiyoda-ku (JP)

(73) Assignee: Asahi Glass Company, Limited, Tokyo (JP)

( * ) Notice: Subject to any disclaimer, the term of this patent is extended or adjusted under 35 U.S.C. 154(b) by 299 days.

(21) Appl. No.: 11/138,954

(22) Filed: May 27, 2005

(65) Prior Publication Data

US 2005/0213212 A1   Sep. 29, 2005

Related U.S. Application Data

(63) Continuation of application No. PCT/JP03/15278, filed on Nov. 28, 2003.

(30) Foreign Application Priority Data

Nov. 29, 2002   (JP) ............................. 2002-348250
Nov. 29, 2002   (JP) ............................. 2002-348251

(51) Int. Cl.
*G02F 1/13*    (2006.01)
*G02F 1/1335*  (2006.01)
*G02F 1/1333*  (2006.01)

(52) U.S. Cl. ............................. 349/2; 349/15; 349/18; 349/117; 349/119; 349/122; 349/197; 349/199

(58) Field of Classification Search ......... 349/194–197, 349/117–122, 2, 15, 18, 86, 88, 183, 199; 356/12
See application file for complete search history.

(56) References Cited

U.S. PATENT DOCUMENTS

| 6,243,063 | B1 * | 6/2001 | Mayhew et al. ................. 345/94 |
| 6,735,017 | B1 * | 5/2004 | Acosta et al. ................. 359/497 |
| 7,250,990 | B2 * | 7/2007 | Sung et al. ..................... 349/15 |
| 2004/0125454 | A1 * | 7/2004 | Kawasaki et al. ............ 359/569 |
| 2004/0239870 | A1 * | 12/2004 | Saeed et al. ................... 349/200 |

FOREIGN PATENT DOCUMENTS

| EP | 0 770 889 A2 | 5/1997 |
| EP | 1 047 964 A1 | 11/2000 |

(Continued)

*Primary Examiner*—David Nelms
*Assistant Examiner*—Hoan C Nguyen
(74) *Attorney, Agent, or Firm*—Oblon, Spivak, McClelland, Maier & Neustadt, P.C.

(57) ABSTRACT

A phase plate having a reduced size and a reduced weight and having accurately parted regions while it has the same function as a conventional two-parted optical rotation plate and an optical data recording/reproducing device capable of stably recording and reproducing are presented. A phase plate P1 comprising a polymer liquid crystal film 2 held between transparent substrates i, 4, wherein the polymer liquid crystal film 2 is parted spatially in the region into which an incident light enters, so that the light transmitting the phase plate assumes a different state of polarization depending on an aligning direction of the molecules of the polymer liquid crystal film 2. The phase plate is located as a two-parted optical rotation plate in an optical data recording/reproducing device.

10 Claims, 13 Drawing Sheets

FOREIGN PATENT DOCUMENTS

| | | |
|---|---|---|
| EP | 1 126 291 A1 | 8/2001 |
| EP | 1 197 766 A2 | 4/2002 |
| JP | 63-189824 | 8/1988 |
| JP | 5-45618 | 2/1993 |
| JP | 6-148692 | 5/1994 |
| JP | 7-287116 | 10/1995 |
| JP | 9-138308 | 5/1997 |
| JP | 10-161108 | 6/1998 |
| JP | 2001-524688 | 12/2001 |
| JP | 2002-6135 | 1/2002 |
| JP | 2002-123949 | 4/2002 |
| JP | 2002-228840 | 8/2002 |
| WO | WO 99/27398 | 6/1999 |
| WO | WO 02/15176 A1 | 2/2002 |

* cited by examiner

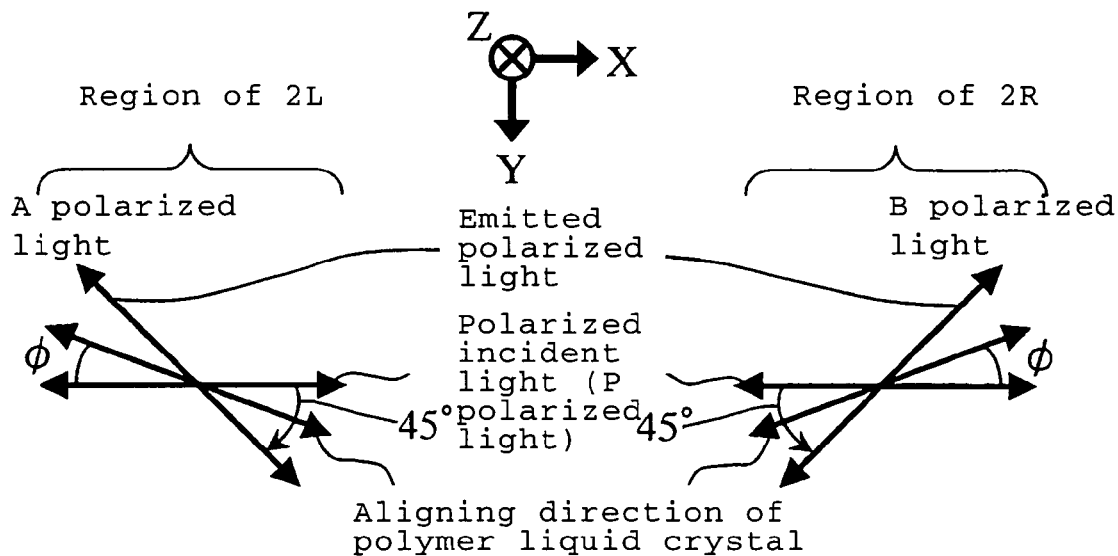
Fig. 5(A)      Fig. 5(B)
Fig. 6
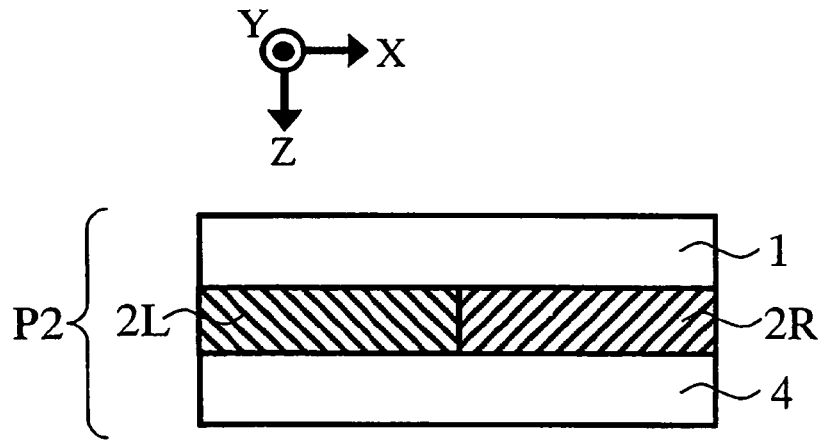

PHASE PLATE AND AN OPTICAL DATA RECORDING/REPRODUCING DEVICE

TECHNICAL FIELD

The present invention relates to a phase plate capable of controlling spatially the state of polarization of an incident light in the region into which the light is irradiated and an optical data recording/reproducing device mounting the same.

Further, the present invention relates to an optical data recording/reproducing device using a flat plate type polarizing beam splitter for separating an incident light into two linearly polarized lights along light paths in a polarization directions which are different from the optical axis of the incident light and which are perpendicular to each other whereby data are recorded in an optical recording medium and the recorded data are reproduced from the medium by utilizing holography.

BACKGROUND ART

In an optical head device widely used recently, for recording/reproducing data with respect to an optical recording medium such as CD or DVD as an optical disk or a magneto-optical disk, pit data having different reflectances or concavity and convexity as a one-dimensional data row are recorded in a single recording surface of the optical recording medium or the recorded data are reproduced from it. Further, there has been attempted to increase the volume of data by laminating surfaces for recording and reproducing. However, the maximum number of lamination per a single disk was about four layers. Accordingly, there was a limit in improving the volume of recording.

On the other hand, the holographic recording for recording data in an optical recording medium by utilizing holography is usually carried out by superimposing an object light carrying image data and a reference light in the recording medium to produce an interference pattern and writing the produced interference pattern as a volume hologram in the optical recording medium. In reproducing the recorded data, a reproducing light is irradiated to the optical recording medium whereby image data are reproduced as a data light due to diffraction by the recorded interference pattern (see, for example, JP-A-2002-123949, hereinbelow, referred to as Patent Document 1).

In such technique, the interference pattern is written three-dimensionally as a volume hologram in the direction of thickness of the optical recording medium. Since it can increase significantly the recording capacity, it draws public attention recently. In the optical recording/reproducing system proposed in the optical data recording/reproducing device disclosed in the above-mentioned Patent Document 1 in particular, an optical disk having an optical recording layer and an optical reflection layer is used as an optical recording medium, a two-parted optical rotation plate and a single objective lens are used and an object light and a reference light are irradiated to the optical recording medium. Accordingly, the optical head device can have the same structure as for CD, DVD or the like. Therefore, the system is effective to reduce the size of the optical data recording/reproducing device.

With reference to FIG. 17, the function of the optical data recording/reproducing device as well as the two-parted optical rotation plate used therein will be described.

The optical data recording/reproducing device has a two-parted optical rotation plate 100 which comprises a two-parted optical rotation plate part 100R located at a right side (+X) of the optical axis and a two-parted optical rotation plate part 100L located at a left side (−X) of the optical axis. The two-parted optional rotation plate part 100R rotates polarization directions of an object light and a reference light by −45° and the two-parted optical rotation plate part 100L rotates the polarization directions by +45°. In determining signs of positive and negative with respect to the angle of rotation, the clockwise rotation is made positive in the coordinate system shown in FIG. 19.

In this optical data recording/reproducing device, an objective lens 118 is provided adjacent to the two-parted optical rotation plate 100 and the objective lens 118 is located facing the side of the optical recording layer 10A of the optical recording medium 10. Further, the optical data recording/reproducing device is provided with an actuator (not shown) for moving the objective lens 118 in the direction of thickness and the direction of tracks of the optical recording medium 10.

Here, definitions of the polarization directions will be made with reference to FIG. 19. The sign of an angle in a clockwise direction is to be positive. An A polarized light is a linearly polarized light which is formed by rotating an S polarized light along the Y axis direction by −45° or by rotating a P polarized light along the X axis direction by +45°, and a B polarized light is a linearly polarized light formed by rotating the S polarized light by +45° or the P polarized light by −45°. The A polarized light and the B polarized light have polarization directions perpendicular to each other.

(I) Then, the principle of recording the data using the two-parted optical rotation plate 100 will be explained.

An object light as an S polarized light is reflected at a polarizing beam splitter (PBS) 116 as a beam combining means to be incident into the two-parted optical rotation plate 100. A reference light as a P polarized light transmits through the polarizing beam splitter 116 to be incident into the two-parted optical rotation plate 100. Here, the object light 20R passing through the two-parted optical rotation plate part 100R and entering into the optical recording medium 10 becomes an A polarized light. On the other hand, the reference light 30L passing through the two-parted optical rotation plate part 100L and entering into the optical recording medium 10 becomes also an A polarized light.

The reference light 30L of A polarized light is reflected at the reflection plane 10D in the light reflection layer 10C of the optical recording medium 10 and passes through the same region as the object light 20R of A polarized light in the optical recording layer 10A. Since these object light 20R and reference light 30L have polarization directions agreed with each other, an interference pattern is formed by the interference of these lights. Further, the object light 20R of A polarized light is reflected at the reflection plane 10D of the optical recording medium 10, and it passes through the same region as the reference light 30L of A polarized light in the optical recording layer 10A. These object light 20R and reference light 30L also produce an interference pattern by the interference since their polarization directions agree with each other.

Accordingly, in the optical recording layer 10A, the interference pattern due to the interference of the A polarized object light 20R before entering into the reflection plane 10D with the A polarized reference light 30L after being reflected at the reflection plane 10D and the interference pattern due to the interference of the A polarized reference light 30L before entering into the reflection plane 10D with the A polarized object light 10R after being reflected at the reflection plane 10D are recorded in a three-dimensional manner. Here, a transparent substrate 10B is formed between the reflection plane 10D and the data recording medium layer 10A.

Similarly, the object light 20L having passed through the two-parted optical rotation plate part 100L to enter into the optical recording medium 10 becomes a B polarized light. Further, the reference light 30R having passed through the two-parted optical rotation plate part 100R to enter into the optical recording medium 10 becomes also a B polarized light. The B polarized reference light 30R is reflected at the reflection plane 10D of the optical recording medium 10 and passes through the same region as the B polarized object light 20L in the optical recording layer 10A.

Since these object light 20L and reference light 30R have their agreed polarization directions, an interference pattern is produced by interference. Further, the B polarized object light 20L is reflected at the reflection plane 10D of the optical recording medium 10 and passes through the same region as the B polarized reference light 30R in the optical recording layer 10A. Since these object light 20L and reference light 30R have their agreed polarization directions, an interference pattern is produced by interference.

Accordingly, in the optical recording layer 10A, the interference pattern due to the interference of the B polarized object light 20L before entering into the reflection plane 10D with the B polarized reference light 30R after having been reflected at the reflection plane 10D and the interference pattern due to the interference of the B polarized reference light 30R before entering into the reflection plane 10D with the B polarized object light 20L after having been reflected at the reflection plane 10D are recorded in a three-dimensional manner.

(II) Then, the principle of reproducing data by using the two-parted optical rotation plate 100 will be explained with reference to FIG. 18.

The reproducing light 40R having passed through the two-parted optical rotation plate part 100R to enter into the optical recording medium 10 becomes a B polarized light. On the other hand, the reproducing light 40L having passed through the two-parted optical rotation plate part 100L to enter into the optical recording medium 10 becomes an A polarized light.

In the optical recording layer 10A, a data light traveling in the opposite direction with respect to the reflection plane 10D is generated by the reproducing light before being reflected at the reflection plane 10D, and a data light traveling toward the reflection plane 10D is generated by the reproducing light after having been reflected at the reflection plane 10D.

The data light traveling in the opposite direction with respect to the reflection plane 10D emits straightly from the optical recording medium 10, and the data light traveling toward the reflection plane 10D emits from the optical recording medium 10 after having been reflected at the reflection plane 10D.

The data lights are rendered to be parallel light beams by the objective lens 118 to be incident into the two-parted optical rotation plate 100. Here, the data light 50R incident into the two-parted optical rotation plate part 100R in the two-parted optical rotation plate 100 is a B polarized light before being incident into the two-parted optical rotation plate part 100R and becomes a P polarized light after having passed through the two-parted optical rotation plate part 100R. On the other hand, the data light 50L incident into the two-parted optical rotation plate part 100L in the two-parted optical rotation plate 100 is an A polarized light before being incident into the two-parted optical rotation plate part 100L and becomes a P polarized light after having passed through the two-parted optical rotation plate part 100L. Thus, the data lights after having passed through the two-parted optical rotation plate 100 become P polarized lights in the entirely cross-sectional view of the light beams.

The data lights having passed through the two-parted optical rotation plate 100 enter into the polarizing beam splitter 116, pass through the polarizing beam splitter plane 116A, pass through the beam splitter plane (BS), an image focusing lens and so on which are not shown, and enter into an image pickup element such as CCD to be converted into electric image signals.

Explanation will be made with reference to the cross-sectional view of FIG. 20 with respect to the structure of the polarizing beam splitter (PBS) used as a beam combining means for aligning the optical axes of an object light and a reference light, as an example.

In prisms 101, 102 each formed by processing a transparent glass block into a light isosceles triangular prism-like shape, a multilayered film 103 is formed on the inclined plane of the prism 101 to form a polarizing beam splitter plane wherein the multilayered film is formed by laminating alternately a thin dielectric film having a relatively large refractive index and a thin dielectric film having a relatively small refractive index in a film thickness of an order of wavelength. Then, the inclined surfaces of the prisms 101, 102 are bonded using a transparent homogeneous adhesive 104 to form a rectangular prism-like polarizing beam splitter PB5.

By adjusting the film thickness of the multilayered film 103, the polarizing beam splitter which reflects an S polarized light component having the polarization direction along the surface of the multilayered film 103 with respect to an incident light of wavelength λ and allows to pass through a P polarized light component having the polarization direction perpendicular to the polarization direction of the S polarized light component, can be formed. Further, by adjusting the film thickness of the multilayered film 103, the reflectance of the S polarized light component and the transmittance of the P polarized light component can also be adjusted.

Further, explanation will be made with reference to FIG. 9 with respect to an optical data recording/reproducing device D4 employing a plurality of polarizing beam splitters PB5 in combination.

A linearly polarized light (S polarized light) emitted from a light source 111 capable of emitting a coherent laser light (an interfering light) is rendered to be parallel light beams by using a collimator lens 112. The parallel light beams are introduced into, for example, a half-wave plate 113 as an optical rotation element to be converted into light beams including an S polarized light component and a P polarized light component wherein the ratio between the S polarized light component and the P polarizing light component to be introduced into a first polarizing beam splitter (PBS) 114 is adjusted.

The P polarized light component having passed through the first polarizing beam splitter 114 is introduced into a first beam splitter (BS) 115.

The first beams splitter (BS) 115 is adapted to allow, for example, 20% of P polarized light component to pass straightly therethrough and to reflect (at a direction of 90°) 80% of P polarized light component. A second polarizing beam splitter 116, a two-parted optical rotation plate 100 and an objective lens 118 are located in this order from the side of the first beam splitter 115 along the traveling direction of light, emitted from the light source 111, after having been reflected at the first beam splitter 115.

Further, a spatial light modulating element 119 and a second beam splitter (BS) 120 are located in this order from the side of the first polarizing beam splitter 114 in this optical data recording/reproducing device, in the traveling direction of the S polarized light component reflected at the first polarizing beam splitter 114 after having passed through the half-wave plate 113.

The spatial light modulating element 119 comprises a large number of pixels arranged in a lattice-like form wherein each pixel is capable of passing light or blocking light selectively whereby light is modulated spatially depending on its intensity whereby it is possible to produce a data carrying object light.

When a liquid crystal device in which aligning directions of liquid crystal molecules change depending on a voltage applied to the transparent electrode formed in each pixel whereby the state of polarization of transmitting light is changed, is used as such spatial light modulating element 119, and a polarizing beam splitter capable of reflecting 100% of S polarized light component and allowing to pass through 100% of P polarized light component is used as the second beam splitter 120, the change in the state of polarization of the light passing through the liquid crystal device is preferably converted into the change of light intensity by this polarizing beam splitter.

Namely, the light passing through a pixel of the liquid crystal device in the state of the S polarized light which is the same as the state of polarization of the incident light is reflected at the second beam splitter 120 and is introduced into the second polarizing beam splitter 116. On the other hand, the light having passed through a pixel of the liquid crystal device in the state of the P polarized light does not enter into the second polarizing beam splitter 116 because it passes through the second beam splitter 120.

The second polarizing beam splitter 116 as a beam combining means reflects the S polarized light component of the incident light, as an object light from the second beam splitter 120 to deflect its traveling direction 90°; passes the P polarized light component of the incident light, as a reference light from the first beam splitter 115, and aligns the optical axis of the object light and the optical axis of the reference light to combine these lights to be introduced into the two-parted optical rotation plate 100 and the objective lens 118.

Thus, the light emitted from the light source 111 is separated into the P polarized light component and the S polarized light component by the first polarizing beam splitter 114 to produce respectively the reference light and the object light and the P polarized light component and the S polarized light component are combined by the second polarizing beam splitter 116 (PBS), and then, the combined lights pass through the two-parted optical rotation plate 100 and the objective lens 118 to be focused on the optical recording medium 10.

Further, in order to reproduce the data of interference pattern recorded in the optical recording medium 10, an image focusing lens 121 and an image pickup element 122 such as CCD are located in this order from the side of the first beam splitter 115, which is at the opposite side of the second polarizing beam splitter 116 with respect to the first beam splitter 115. With this arrangement, only the reproducing light is irradiated to the optical recording medium 10; the data light reproduced at the medium passes through the second polarizing beam splitter 116; a part of the light passes through the first beam splitter 115 and enters into the image pickup element 122 through the image focusing lens 121. Thus, the data of interference pattern produced in the spatial light modulating element 119 and recorded in the optical recording medium 10 can be reproduced by the image pickup element 122.

Now, explanation will be made with reference to FIG. 21 on an embodiment of a flat plate type polarizing beam splitter PB6 capable of reducing the size of the device, in comparison with the rectangular prism-like polarizing beam splitter PB5 formed by bonding two prisms.

A polymer liquid crystal layer 106 having an ordinary refractive index $n_o$ and an extraordinary refractive index $n_e$ is formed by forming an alignment layer on a single surface of a transparent substrate 105, conducting an aligning treatment, coating liquid crystal monomer on the film followed by polymerizing.

Then, the polymer liquid crystal layer 106 is subjected to photolithography and reactive ion etching to process it to have a blazed grating having a saw-tooth-form in cross section and a grating constant (pitch) L. Then, a homogeneous refractive index transparent material having the same refractive index as the ordinary refractive index $n_o$ is filled in concave portions of the polymer liquid crystal layer 106 to thereby form a homogeneous refractive index transparent material 107, and at the same time, the transparent substrate 105 and a transparent substrate 108 are bonded together.

When a P polarized light as an ordinary polarized light is incident into the polymer liquid crystal layer 106, the light passes straightly through it without diffraction since the refractive index of the polymer liquid crystal layer 106 agrees with the refractive index of the homogeneous refractive index transparent material 107. On the other hand, when an S polarized light as an extraordinary polarized light is incident into the polymer liquid crystal layer 106, a diffracted light is generated since the refractive index of the polymer liquid crystal layer 106 is different from the refractive index of the homogeneous refractive index transparent material 106.

For example, the height d of the saw-tooth-like polymer liquid crystal layer 106 satisfies formula $(n_e - n_o) \times d = \lambda$ with respect to an incident light of wavelength $\lambda$, the maximum diffracted light generates in a direction of angle $\theta$ satisfying $\sin \theta = \lambda/L$ (where L is a grating constant (pitch)). In this way, the flat plate type polarizing beam splitter PB6 is obtainable.

In the above-mentioned Patent Document 1 disclosing the optical data recording/reproducing device, there is found explanation relating to the function of the two-parted optical rotation plate 100. However, it fails to disclose a concrete structure of the device. Further, the two-parted optical rotation plate 100 whose principle of operation is shown in FIGS. 17 and 18 has the structure that the two-parted optical rotation plate part 100R and the two-parted optical rotation plate part 100L are adjacently located. Even though a person skilled in the art can consider to arrange a wavelength plate using a birefringent material such as quartz or the like, no device usable practically was disclosed. In such circumstances, there is a strong demand to develop an optical device (phase plate) of small size and light weight and having regions defined highly accurately so as to perform the same function as the two-parted optical rotation plate.

Further, it is effective to form an interference pattern in a specified region of an optical recording medium 10 by applying to an optical data recording/reproducing device a focus servo method and a tracking servo method used for an optical head device performing data-recording/reproducing for an optical disk such as CD, DVD or the like.

For example, a beam splitter having wavelength selectivity (not shown) is located as a color beam combining means in the light path between the polarizing beam splitter 116 and the two-parted optical rotation plate 100 in FIG. 17 wherein the beam splitter being capable of passing light beams having a wavelength $\lambda$ as the before-mentioned object light and reference light therethrough and reflecting light beams having a wavelength $\lambda_s$ ($\lambda_s \neq \lambda$) which is different from the wavelength $\lambda$ and which is not photo-sensitive to the optical recording medium 10, and the optical axis of the incident light of wavelength $\lambda_s$ is made coincident with the optical axis of the incident light of wavelength $\lambda$ so as to focus the light beams into the light reflection layer of the optical recording medium by means of the objective lens 118. The light of wavelength $\lambda_s$ reflected at the light reflection layer is separated by the above-mentioned beam splitter having wavelength selectivity to be detected by a photodetector.

However, when the light of wavelength $\lambda_s$ passes through the two-parted optical rotation plate 100, the focused light spot is expanded because the polarized light is not uniform in traveling spatially whereby there causes the problems that the conventionally used focus servo method and the tracking servo method can not be applied.

Further, in order to control light paths of the transmitting light and the reflected light with good reproducibility and high accuracy in the above-mentioned rectangular prism-like polarizing beam splitter PB5 shown in FIG. 20, it was necessary to process a glass block accurately to have a right isosceles triangular prism form and to bond and fix two prisms with good accuracy. It resulted an expensive optical component, and when a plurality of polarizing beam splitters and beam splitters were used in the optical data recording/reproducing device D4 shown in FIG. 9, the cost was increased and there was the problem that the adjustment of optical axes was difficult.

Further, in the case of the flat plate type polarizing beam splitter PB6 shown in FIG. 26, the angle of separation $\theta$ by the diffraction of the P polarized light and S polarized light relied on the processable grating constant (pitch) L, specifically, about 4 μm. Accordingly, the angle of separation $\theta$ with respect to visible light restricted to about 10°. As a result, when the flat plate type polarizing beam splitter PB6 was used in the optical data recording/reproducing device as shown in FIG. 9, the entire optical system became large in size in order to ensure the irradiation planes for the object light and the reference light.

DISCLOSURE OF THE INVENTION

The present invention was made in view of these problems, and the object of the present invention is to provide a phase plate of small size and light weight and having regions defined highly accurately so as to perform the same function as the two-parted optical rotation plate and an optical data recording/reproducing device mounted the same.

Further, the present invention is to provide an optical data recording/reproducing device to which the conventionally used focus servo method and tracking servo method can be applied in order to form an interference pattern in a specified region of an optical recording medium.

Further, the present invention is to provide an optical data recording/reproducing device mounting thereon a flat plate type polarizing beam splitter which can realize a structure for reducing the size and cost in comparison with a rectangular prism-like polarizing beam splitter and which can increase the angle of separation on an S polarized light and a P polarized light.

Further, the present invention is to provide an optical data recording/reproducing device being small and easy for adjustment by mounting thereon a unified body comprising a plurality of flat plate type polarizing beam splitters or by using a plurality of flat plate type polarizing beam splitters.

In accordance with the present invention, there is provided a phase plate comprising a polymer liquid crystal film held between transparent substrates, wherein the polymer liquid crystal film is parted spatially in the region, into which an incident light of wavelength $\lambda$ enters, so that the light transmitting the phase plate assumes a different state of polarization depending on an aligning direction of the molecules of the polymer liquid crystal film.

Further, in the above-mentioned phase plate, the polymer liquid crystal film comprises two polymer liquid crystal films having a retardation value of $(m+\frac{1}{2})\times\lambda$ (where m is zero or an integer of positive sign) with respect to the incident light of wavelength $\lambda$ and having molecules aligned uniformly with respect to the surfaces of the transparent substrates wherein aligning directions of the molecules are parted spatially in the two polymer liquid crystal films with a specified relative angle.

Further, in the above-mentioned phase plate, the specified angle is 45°.

Further, in the above-mentioned phase plate, the phase plate comprises a transparent substrate having a surface on which a polymer liquid crystal film whose molecules are aligned in a specified direction with respect to its surface, is formed in a spatially parted region and another transparent substrate having a surface on which a polymer liquid crystal film whose molecules are aligned in a specified direction different from the that of the former polymer liquid crystal film with respect to its surface, is formed in the other spatially parted region, and the transparent substrates are laminated so that the region of one polymer liquid crystal film and the region of the other polymer liquid crystal film are not overlapped each other in plane view.

Further, there is provided a phase plate comprising a polymer liquid crystal film and an organic birefringent film laminated, which are held between transparent substrates, wherein the polymer liquid crystal film is formed on a specified region in a surface of at least one transparent substrate and has a retardation value of $(m_{1}+\frac{1}{2})\times\lambda$ (where $m_1$ is zero or an integer of positive sign) with respect to an incident light of wavelength $\lambda$, the aligning direction of the molecules of the polymer liquid crystal film being uniform, and the organic birefringent film has a retardation value of $(m_{2}+\frac{1}{2})\times\lambda$ (where $m_2$ is zero or an integer of positive sign) with respect to an incident light of wavelength $\lambda$, the aligning direction of the molecules of the polymer liquid crystal film being uniform in a direction different from the aligning direction of the polymer liquid crystal film.

Further, there is provided an optical data recording/reproducing device for recording in the optical recording layer of a disk-like optical recording medium an interference pattern as data, formed by the interference of an object light and a reference light irradiated to the disk-like optical recording medium having said optical recording layer and a light reflection layer, and for reproducing the recorded data by irradiating a reproducing light to the recorded interference pattern, the optical data recording/reproducing device being characterized by comprising a beam combining means for aligning into the same optical axis the optical axes of the object light and reference light incident into the optical recording medium and an objective lens allowing the object light and the reference light to pass through the optical recording layer in the optical recording medium and focusing them on the light reflection layer, and further comprising the phase plate described above, which is located in the optical path between the beam combining means and the optical recording medium.

Further, in the above-mentioned phase plate, the polymer liquid crystal film as a constituent element of the phase plate has a retardation value of $k\times\lambda_s$ (where k is an integer of positive sign) with respect to an incident light having a wavelength $\lambda_s$ which is different from the wavelength $\lambda$ of the incident light.

Further, there is provided an optical data recording/reproducing device for recording in the optical recording layer of a disk-like optical recording medium an interference pattern as data, formed by the interference of an object light having a wavelength of $\lambda$ and a reference light both irradiated to the disk-like optical recording medium having said optical recording layer and a light reflection layer, and for reproducing the recorded data by irradiating a reproducing light having a wavelength of $\lambda$ to the recorded interference pattern, the optical data recording/reproducing device being characterized by comprising a beam combining means for aligning into the same optical axis the optical axes of the object light and reference light incident into the optical recording medium, a color beam combining means for aligning into the same optical axis the optical axes of the object light and reference light and the optical axis of an incident light having a wavelength $\lambda_s$ which is different from the wavelength $\lambda$ and an objective lens allowing the object light, the reference light and the incident light of wavelength $\lambda_s$ to pass through the optical recording layer in the optical recording medium and focusing them on the light reflection layer, and further comprising the phase plate described above, which is located in the optical path extending from the beam combining means through the color beam combining means to the optical recording medium.

Further, in the above-mentioned optical data recording/reproducing device wherein data are recorded in the optical recording medium by parting light having a wavelength $\lambda$ emitted from a light source into a first linearly polarized light and a second linearly polarized light by means of a first polarizing beam splitter, irradiating the first linearly polarized light to a spatial light modulator to produce an object light carrying data, using the second linearly polarized light as a reference light, and combining the object light and the reference light so as to align into the same optical axis by a second polarizing beam splitter as a beam combining means, and the data recorded in the optical recording layer are reproduced as a data carrying light by irradiating a reproducing light being a linearly polarized light parted by the first polarizing beam splitter to the optical recording layer in the optical recording medium, wherein the first polarizing beam splitter and the second polarizing beam splitter are polarizing beam splitters provided with polarizing diffraction gratings for parting the transmitting light along polarization directions by diffracting first and second linearly polarized incident lights whose polarization directions are perpendicular to each other, and the diffraction gratings have diffraction characteristics that the polarization separation angle formed by the diffracted first linearly polarized light and the diffracted second linearly polarized light is larger than the diffraction angle of the incident linearly polarized light.

Further, in the above-mentioned optical data recording/reproducing device, each of the first and second polarizing beam splitters comprises a homogeneous refractive index transparent material having an averaged refractive index between an ordinary refractive index $n_o$ and an extraordinary refractive index $n_e$, which is filled in at least concave portions of a polymer liquid crystal layer having an ordinary refractive index $n_o$ and an extraordinary refractive index $n_e$ and having the cross-sectional shape of a saw-tooth form.

In the above-mentioned optical data recording/reproducing device, each of the first and second polarizing beam splitters comprises a first polarizing diffraction grating for diffracting only an incident light of first linearly polarized light and a second polarizing diffraction grating for diffracting only an incident light of second linearly polarized light, which are laminated.

Further, in the above-mentioned optical data recording/reproducing device, each of the first and second polarizing diffraction gratings comprises a polymer liquid crystal layer having an ordinary refractive index $n_o$ and an extraordinary refractive index $n_e$ and having the cross-sectional shape of a saw-tooth-like form and a homogeneous refractive index transparent material having an ordinary refractive index $n_o$ or an extraordinary refractive index $n_e$, which is filled in at least concave portions of the polymer liquid crystal layer wherein the polymer liquid crystal layer comprises two polymer liquid crystal layers in which the aligning directions of the molecules in the layers are perpendicular to each other.

BRIEF DESCRIPTION OF THE DRAWINGS

FIG. 5 is a diagram showing the function of the phase plate of the present invention with respect to A and B polarized incident lights.

FIG. 6 is a cross-sectional view showing a constructional example of a second embodiment of the phase plate according to the present invention.

BEST MODE FOR CARRYING OUT THE INVENTION

In the following, some embodiments of the present invention will be described with reference to the accompanied drawing.

FIRST EMBODIMENT OF PHASE PLATE

Figure 1:
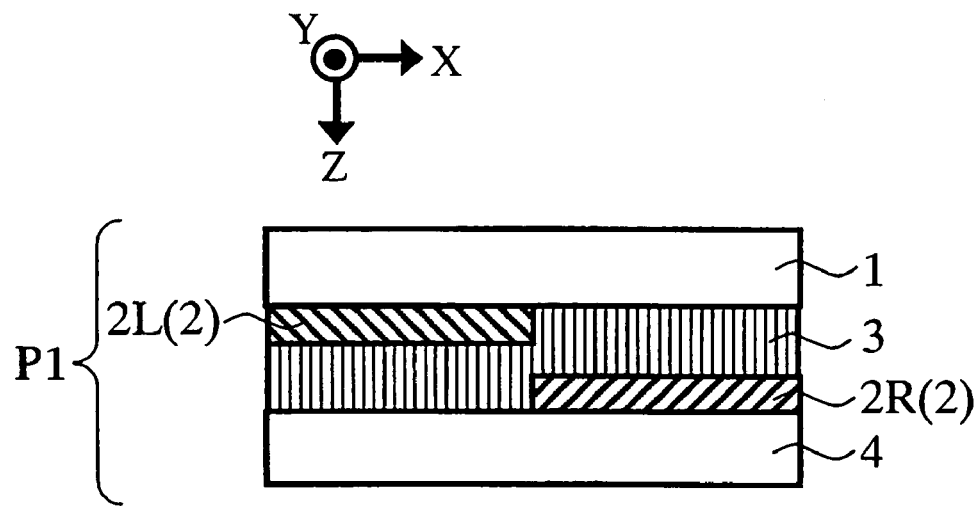
FIG. 1 is a cross-sectional view showing a constructional example of a first embodiment of the phase plate according to the present invention.
Figure 2:
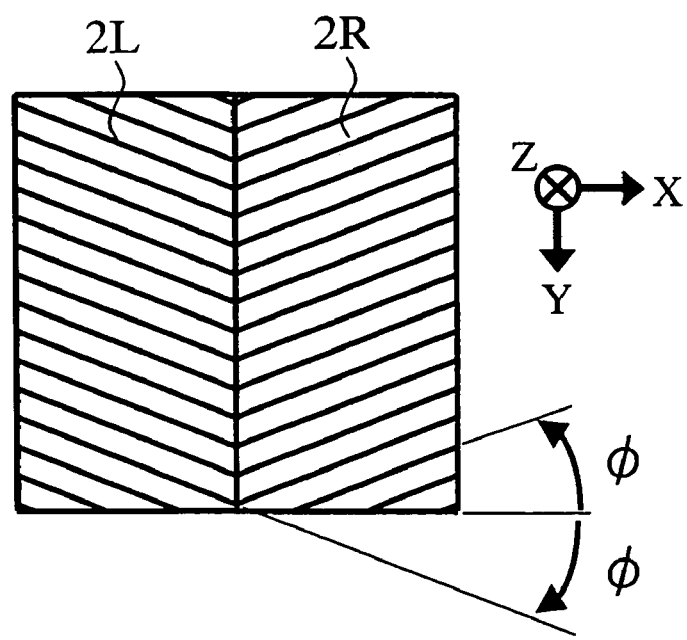
FIG. 2 is a plane view showing a constructional example of a first embodiment of the phase plate according to the present invention.

FIG. 1 and FIG. 2 are respectively a cross-sectional view and a plane view showing a phase plate P1 of a first embodiment concerning the phase plate according to the present invention.

The phase plate P1 is of a 4-layer structure comprising a transparent substrate 1, a polymer liquid crystal film 2 (2L, 2R), a homogeneous refractive index transparent material 3 and a transparent substrate 4 wherein the order of laminated materials is partially different in left and right regions.

A polymer liquid crystal film 2L having a retardation value of $\lambda/2$ with respect to a wavelength $\lambda$ is formed in only a left side portion of two-parted regions in a single surface of the transparent substrate 1 as the top layer, and a polymer liquid crystal film 2R having a retardation value of $\lambda/2$ with respect to the wavelength $\lambda$ is formed in only a right side portion of two-parted regions in a single surface of the transparent substrate 4. The transparent substrate 1 and the transparent substrate 4 are bonded so that the homogeneous refractive index transparent material 3 is filled in the space where there is no polymer liquid crystal film. Thus, the phase plate P1 having two-parted portions is formed.

The polymer liquid crystal film 2 is prepared as follows.

Alignment layers (not shown) for aligning liquid crystal are coated on the transparent substrates 1, 4, treatments for providing predetermined aligning directions are carried out respectively, a mixed solution comprising liquid crystal monomer having an anisotropy refractive index and a polymerization initiator is coated uniformly, and ultra-violet rays for photopolymerization are irradiated to polymerize the solution. Thus, the polymer liquid crystal films 2L, 2R are formed in parallel to the surface of each transparent substrates 1, 4. Here, the alignment layer on each of the transparent substrates 1, 4 is previously subjected to an aligning treatment in an oblique direction as shown in FIG. 2 whereby liquid crystal molecules in the polymer liquid crystal films 2L, 2R are aligned mutually with predetermined angles. Here, each of the predetermined angles means an angle between 40° and 50°. A desired effect can be obtained within such angle range although the best angle is 45°. In the following explanation is made in the case of 45°.

Then, the polymer liquid crystal films in specified regions on the transparent substrates 1, 4 are removed by using photolithography and a reactive ion etching method. Namely, they are processed so that the polymer liquid crystal film 2L is in only a left side portion of the two-parted regions and the polymer liquid crystal film 2R is in only a right side portion of the two-parted regions. By this, a half-wave phase plate P1 having two-parted portions in plane view can be obtained wherein when the polymer liquid crystal has an ordinary refractive index of $n_o$ and an extraordinary refractive index of $n_e$ ($n_e > n_o$), the angular orientation of $\Phi$ in a counterclockwise rotation, as indicated by oblique lines in FIG. 2, is the direction of extraordinary refractive index, i.e. a slow axis. Here, the angle $\Phi$ is 22.5° so that the aligning directions of liquid crystal molecules in the polymer liquid crystal films 2L, 2R make an angle of 45°.

Now, explanation will be made as to states of polarization of emission light in a case that an S polarized light and a P polarized light as linearly polarized lights which have a wavelength $\lambda$ and whose polarization directions are perpendicular to each other, enter into the phase plate P1 with reference to FIGS. 3 and 4.

Figures 3A, 3B:
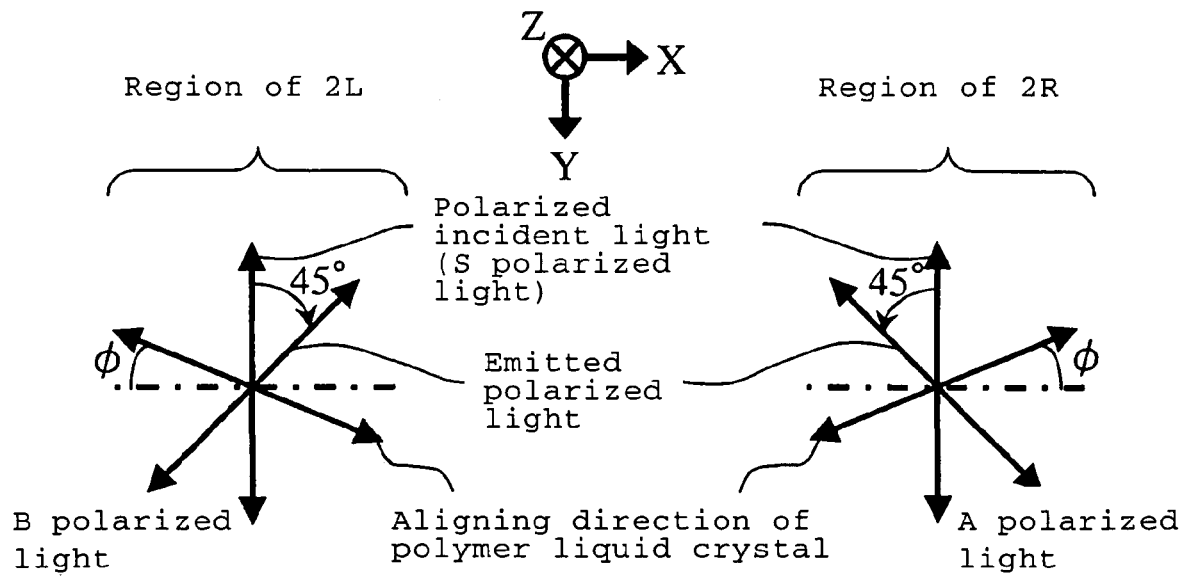
FIG. 3 is a diagram showing the function of the phase plate of the present invention with respect to an S polarized incident light.

The S polarized light, when passed through the region of the polymer liquid crystal film 2L in a +Z direction, has a polarization direction rotated by +45° so as to become a B polarized light (see FIG. 3(A)). However, when it passes through the region of the polymer liquid crystal 2R, the polarization direction is rotated by −45° to become an A polarized light (see FIG. 3(B)).

Figures 4A, 4B:
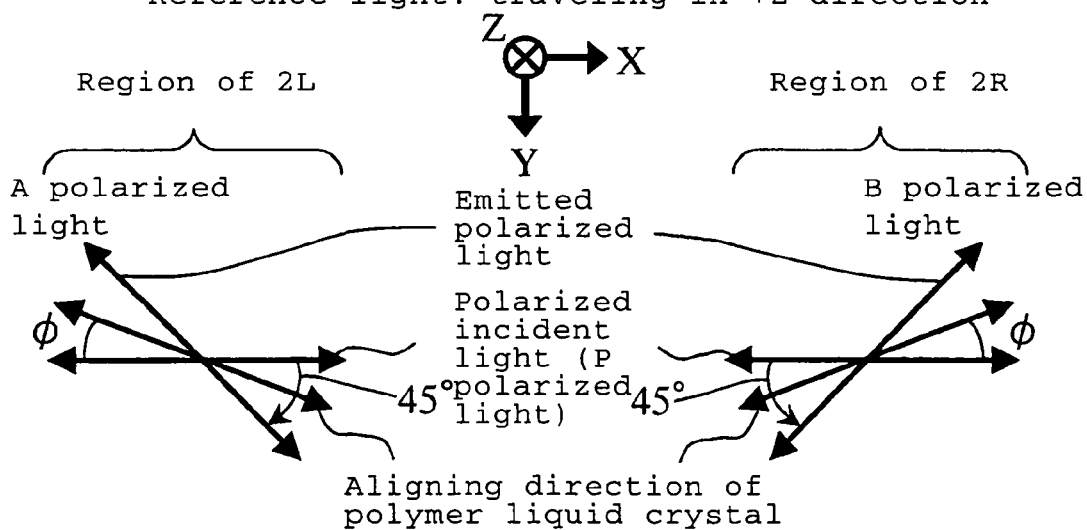
FIG. 4 is a diagram showing the function of the phase plate of the present invention with respect to a P polarized incident light.

On the other hand, the P polarized light, when passed through the region of the polymer liquid crystal film 2L in a +Z direction, the polarization direction is rotated by +45° to become an A polarized light (see FIG. 4(A)). However, when it passes through the region of the polymer liquid crystal film 2R, the polarization direction is rotated by −45° to become a B polarized light (see FIG. 4(B)). Accordingly, the phase plate P1 provides the same function as the two-parted optical rotation plate 100 shown in FIG. 17 when data are recorded by using the optical data recording/reproducing device which will be described later.

Further, explanation will be made as to states of polarization of emission light in a case that an A polarized light and a B polarized light as linearly polarized lights of wavelength $\lambda$ having polarization directions perpendicular to each other are respectively incident into the regions of polymer liquid crystal film 2L and polymer liquid crystal film 2R of the phase plate P1 with reference to FIG. 5.

The A polarized light, when passed through the region of the polymer liquid crystal film 2L in a −Z direction, the polarization direction is rotated by −45° to become a P polarized light. On the other hand, the B polarized light, when passed through the region of the polymer liquid crystal film 2R in a −Z direction, the polarization direction is rotated by +45° to become a P polarized light.

Accordingly, the phase plate P1 can provide the same function as the two-parted optical rotation plate 100 shown in FIG. 18 in the case of reproducing data by using the optical data recording/reproducing device described later.

Figure 17:
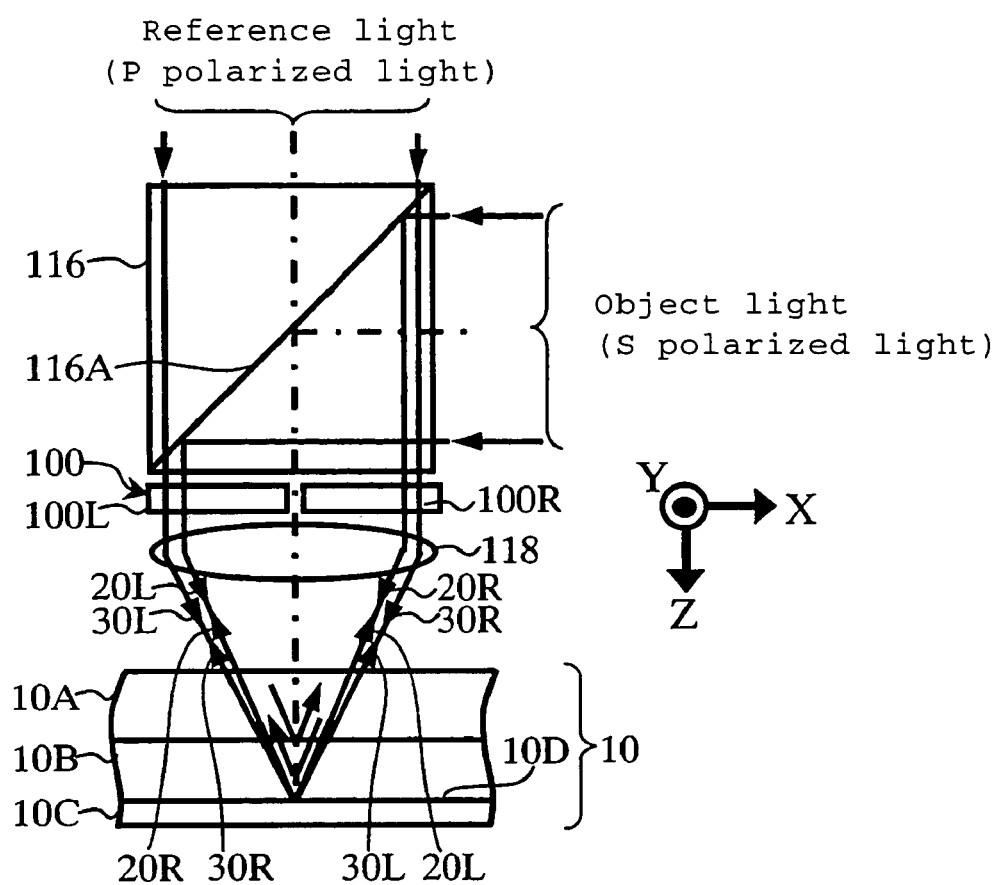
FIG. 17 is an explanatory diagram for explaining the principle of recording in a conventional optical data recording/reproducing device.
Figure 18:
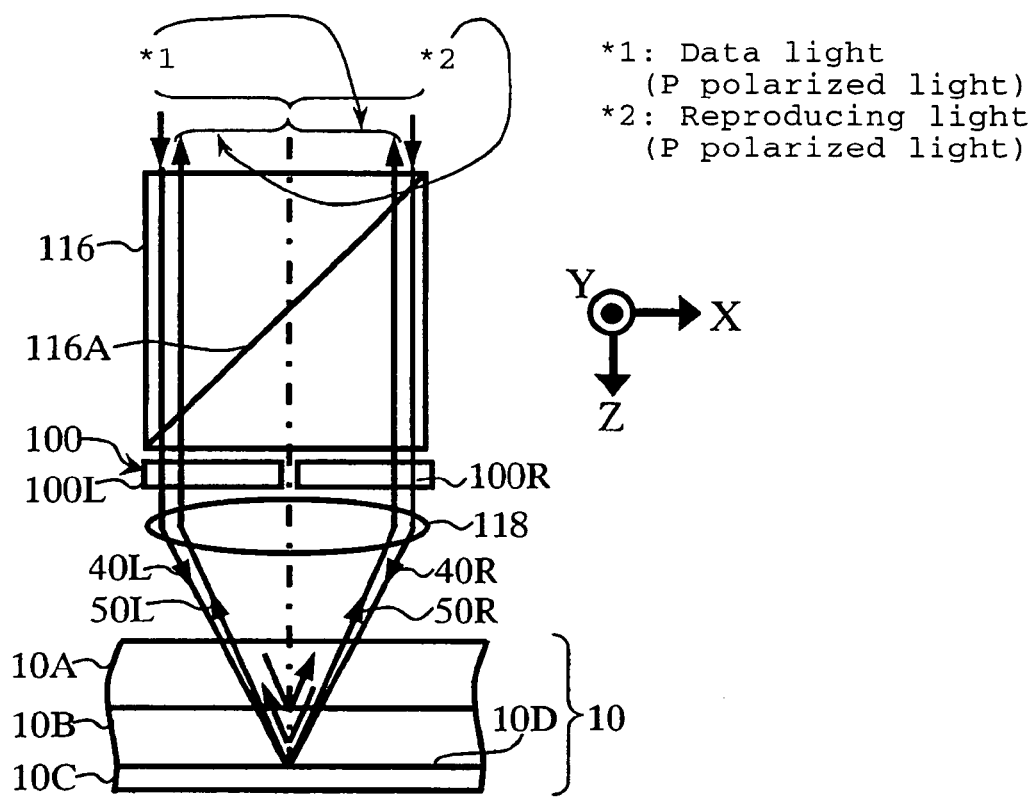
FIG. 18 is an explanatory diagram for explaining the principle of reproducing in a conventional optical data recording/reproducing device.
Figure 19:
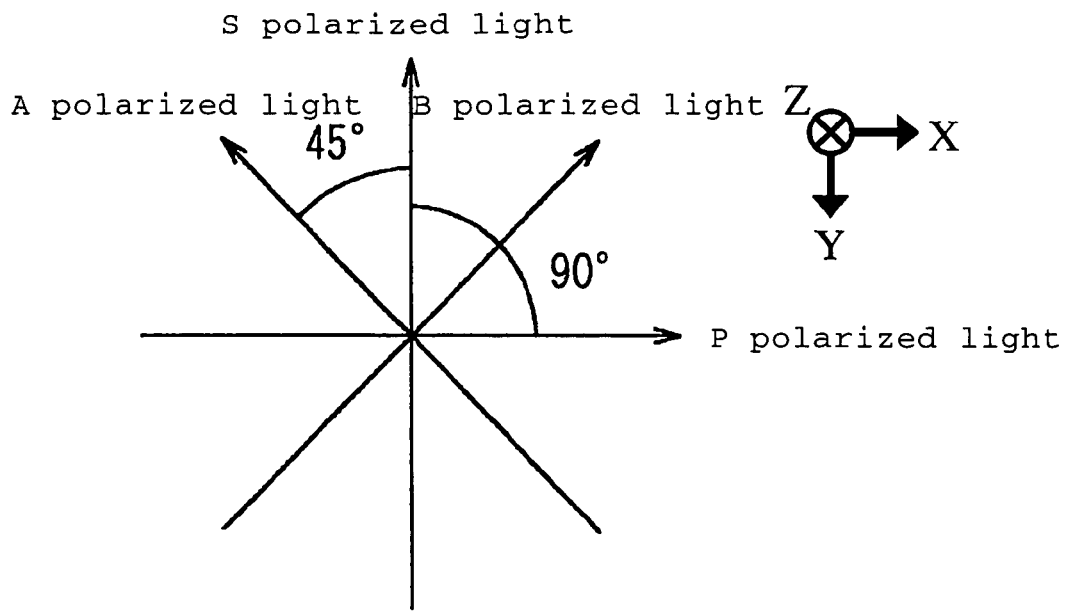
FIG. 19 is an explanatory diagram for explaining polarization.

Accordingly, when the phase plate P1 of the present invention is used for two-parted optical rotation plate 100 shown in FIGS. 17 and 18, the same function can be realized with only a single part. Further, the etching and the position adjustment to the polymer liquid crystal films can be conducted with high accuracy to the nearest micron level. Accordingly, there can be less deterioration of the characteristics due to the displacement of boundary of the two-parted regions of the polymer liquid crystal film 2L and the polymerization liquid crystal film 2R.

SECOND EMBODIMENT OF PHASE PLATE

Now, a phase plate P2 as a second embodiment concerning the phase plate of the present invention will be described with reference to drawing.

FIG. 6 is a cross-sectional view showing the phase plate P2 of the second embodiment of the present invention. In this phase plate P2, the different point is that unlike the first embodiment in which polymer liquid crystal films having different aligning directions, which correspond to the polymer liquid crystal film 2L and the polymer liquid crystal film 2R, are formed by etching and patterning, a photo-aligning method is used for photopolymerization of liquid crystal monomer so that the aligning directions of the liquid crystal molecules of the polymer liquid crystal films 2L, 2R make an angle of 45°.

Specifically, a mixed solution of liquid crystal monomer having an anisotropy refractive index and a polymerization initiator is injected uniformly between the transparent substrates 1 and 4 and ultraviolet rays for photopolymerization are irradiated as a linearly polarized light so that a polarization direction of +22.5° is applied to the region of the polymer liquid crystal film 2L and a polarization direction of −22.5° is applied to the region of the polymer liquid crystal film 2R. Thus, the polymer liquid crystal films 2L, 2R can be formed to have the same parted aligning layers as the first embodiment.

There is a method employing another photo-aligning method. Alignment layers are formed on the regions of the polymer liquid crystal films 2L, 2R on the transparent substrates 1, 4, patterning and aligning treatments are carried out to the alignment layers so that aligning directions of the liquid crystal molecules of the polymer liquid crystal films 2L, 2R will make an angle of 45°, a mixed solution of liquid crystal monomer having an anisotropy refractive index and a polymerization initiator is coated uniformly, and ultraviolet rays for photopolymerization are irradiated to polymerize the solution whereby the polymer liquid crystal films 2L, 2R each having a parallel alignment in response to the aligning direction of the alignment layer in each region on the transparent substrates 1, 4, can be formed.

Accordingly, the phase plate P2 of the second embodiment can omit the etching process to the polymer liquid crystal film aligned uniformly and the filling process of the homogeneous refractive index transparent material 6, as conducted in the phase plate P1 of the first embodiment. Therefore, the manufacturing process can be simplified.

THIRD EMBODIMENT OF PHASE PLATE

Now, explanation will be made with reference to the drawing on a phase plate P3 as a third embodiment according to the phase plate according to the present invention.

Figure 7:
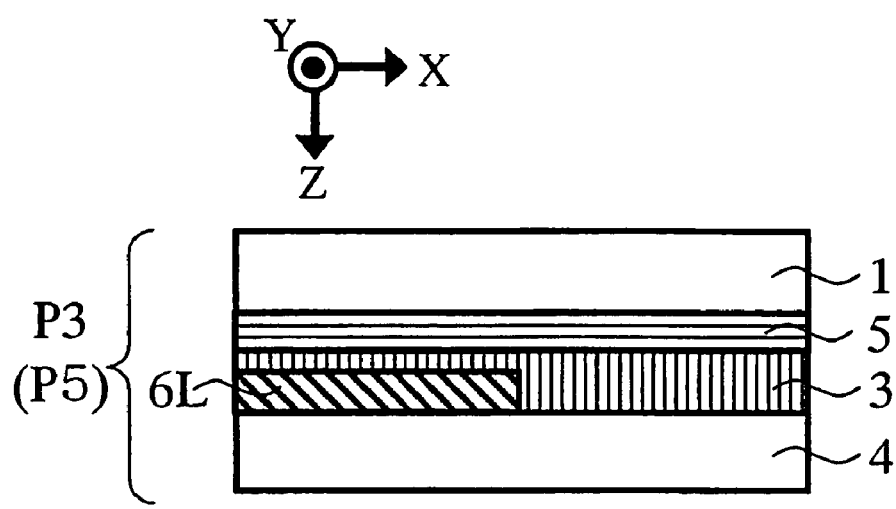
FIG. 7 is a cross-sectional view showing a constructional example of a third embodiment of the phase plate according to the present invention.

FIG. 7 is a cross-sectional view showing the phase plate P3 of the third embodiment of the present invention. In this phase plate P3, a half-wave plate 5 having a retardation value of $\lambda/2$ with respect to a wavelength $\lambda$ is formed uniformly on a single surface at a light incident side of a transparent substrate 1, the slow axis of which extends in an angular direction of $\Phi=22.5°$ in counterclockwise rotation in the same manner as the polymer liquid crystal film 2R shown in FIG. 2.

Further, a polymer liquid crystal film 6L having a slow axis extending in an X axis direction ($\Phi=0°$) in FIG. 2 and a retardation value of $\lambda/2$ with respect to the wavelength $\lambda$ is formed on a single surface at a light emission side of a transparent substrate 4 in only a left portion in the two-parted regions of the device. The transparent substrate 1 and the transparent substrate 4 are bonded so that the region without the polymer liquid crystal film is filled with a homogeneous refractive index transparent material 3.

For the half-wave plate 5, a film formed by stretching polycarbonate in a specified direction to provide birefringence is used. The S polarized light or P polarized light passing through this half-wave plate has its polarization direction rotated by −45°. Further, light passing through the region of phase plate 6L has its polarization direction rotated by further ±90°. Accordingly, the optical performance of the phase plate P3 is the same as that of the first or second embodiment. Further, since it has only the polymer liquid crystal film 6L in comparison with the first embodiment, it is unnecessary to consider position adjustment. Accordingly, the two-parted phase plate can stably be obtained.

FOURTH EMBODIMENT OF PHASE PLATE

Now, a phase plate P4 as a fourth embodiment of the phase plate according to the present invention will be described with reference to the drawing.

Figure 8:
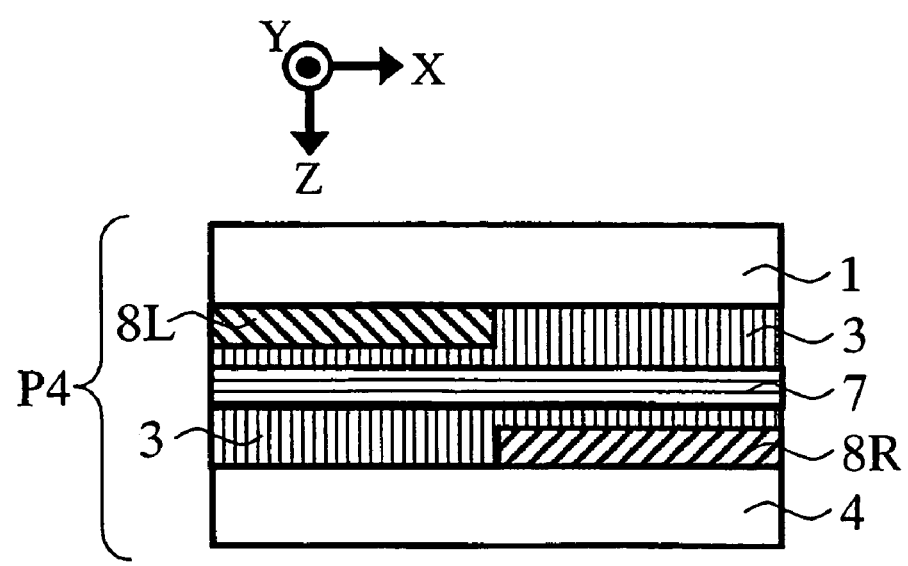
FIG. 8 is a cross-sectional view showing a constructional example of a fourth embodiment of the phase plate according to the present invention.

FIG. 8 is a cross-sectional view showing the phase plate P4 according to the fourth embodiment of the present invention. In this phase plate 4, a polymer liquid crystal film 8L having a retardation value of $\lambda/2$ with respect to a wavelength $\lambda$ is formed on a single surface of a transparent substrate 1 in only a left side portion of the two-parted regions, and a polymer liquid crystal film 8R having a retardation value of $\lambda/2$ with respect to the wavelength $\lambda$ is formed on a single surface of a transparent substrate 4 in only a right side portion of the two-parted regions. A homogeneous refractive index transparent material 3 is filled in the area without the polymer liquid crystal films in the same manner as the first embodiment.

The different points in this phase plate P4 are such that the aligning directions of the molecules in the polymer liquid crystal films 8L, 8R, i.e., the slow axis directions thereof, are the same, and a half-wave plate 7 having a retardation value of $\lambda/2$ with respect to the wavelength $\lambda$ are sandwiched between the liquid crystal films. The angles $\Phi$ of the slow axes of the polymer liquid crystal films 8L and 8R and the half-wave plate to the X axis are rendered to be $\alpha+22.5°$, $\alpha-22.5°$ and $\alpha$ respectively, where $\alpha$ can be an optional angle.

The above-mentioned structure provides the feature as follows. Despite of the polarization direction of a linearly polarized incident light, the polarization states of emission light in the two-parted regions of polymer liquid crystal films 8L, 8R are linear polarizations of ±45° with respect to the polarization directions of incident light, namely, linearly polarized emission lights crossing at a right angle can be obtained. As a result, even when the polarization direction of incident light fluctuates from a predetermined slow axis direction of the half-wave plate 7, linearly polarized lights crossing at a right angle are always emitted from the phase plate P4 according to the present invention, while in the phase plates according to the first to third embodiments, the polarization directions of emission light do not cross at a right angle.

First Embodiment of Optical Data Recording/Reproducing Device

In the following, a first embodiment of the optical data recording/reproducing device of the present invention will be described wherein the phase plate P1 as the first embodiment of the phase plate is used as the two-parted optical rotation plate 100 of the optical data recording/reproducing device shown in FIG. 9.

Figure 9:
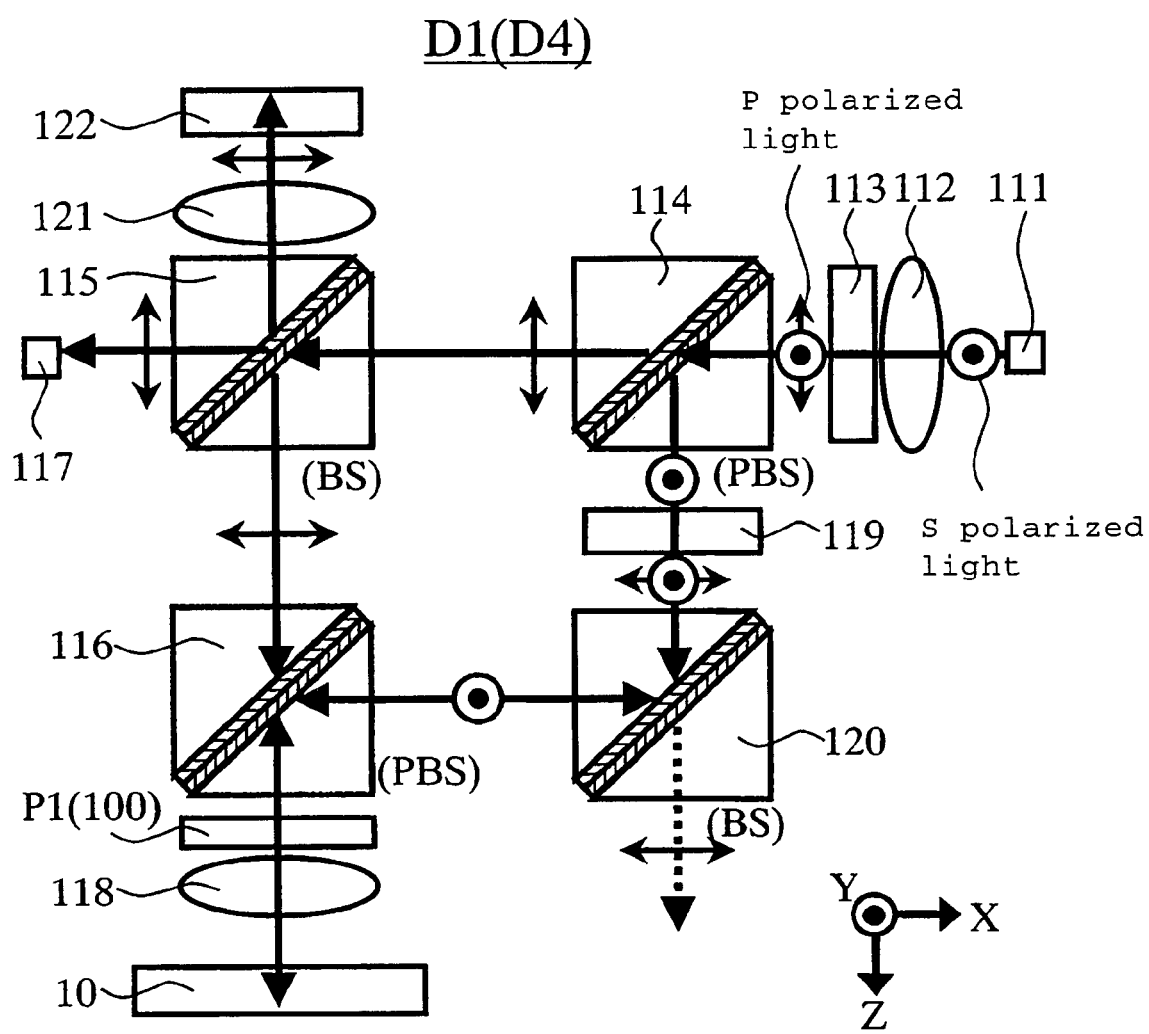
FIG. 9 is an explanatory diagram showing a first embodiment of the optical data recording/reproducing device according to the present invention. Also it is the explanatory diagram showing the structure of a conventional optical data recording/reproducing device D4 mounting a two-parted optical rotation element 100.

The optical data recording/reproducing device D1 shown in FIG. 9 comprises generally a light source 111, a collimator lens 112, a half-wave plate 113 as an optical rotation element, a first polarizing beam splitter 114 (PBS) for separating the emission light from the light source 111, a spatial light modulating element 119 for producing an object light, a second beam splitter (BS) 120 reflecting an S polarized light component of the object light, a second polarizing beam splitter 116 (PBS) for combining an object light and a reference light, a first beam splitter (BS) 115 for separating a reference light from a data light, a photodetector 117 for monitoring the light intensity of the reference light, a lens 121 for focusing the data light onto an image pickup element 122, the phase plate P1 according the first embodiment and an objective lens 118 for focusing the reference light, the object light and a reproducing light onto an optical recording medium 10. In particular, the phase plate P1 has function as the two-parted optical rotation plate 100 shown in FIGS. 17 and 18.

Any of the phase plates P2 to P4 according to the second to fourth embodiments may be used as the two-parted optical rotation plate for the optical data recording/reproducing device of the present invention, other than the phase plate P1 of the first embodiment.

Accordingly, as shown in FIG. 9, when the phase plate P1 according to the first embodiment (although any of the phase plates P2 to P4 may be used) is used for the conventional two-parted optical rotation plate 100 of optical data recording/reproducing device shown in FIGS. 17 and 18, a recording/reproducing optical system having a small size and a light weight and having accurately parted regions for the polarized light components of transmitting light, can be realized.

As the phase plate used in this embodiment, a phase plate in which the number of partition of the polymer liquid crystal films (2L, 2R or 8L, 8R) is further increased to provide further different polarization states of transmitting light, may be used.

Although description has been made as to the case that the aligning directions of the molecules of the polymer liquid crystal film in each parted region in the phase plate are in parallel to the surfaces of the transparent substrates and are uniform in the thickness direction, the polymer liquid crystal molecules may have a twisted alignment in the thickness direction or a bent alignment with an inclination with respect to the transparent substrates in the thickness direction as long as transmitting light can be polarized to be desired spatially parted polarized lights.

FIFTH EMBODIMENT OF PHASE PLATE

Now, description will be made as to a phase plate P5 as a fifth embodiment of the phase plate according to the present invention.

This phase plate is the same as the phase plates P1 to P4 as two-parted optical rotation plates according to the first to fourth embodiments except that the retardation value with respect to an incident light having a wavelength $\lambda_s$ ($\lambda_s \neq \lambda$), of each of the polymer liquid crystal films 2L, 2R, 6L, 7, 8L, 8R and the half-wave plates 5, 7 as constructional elements of the phase plates, is $k \times \lambda_s$ (where k is an integer of positive sign).

For example, assuming that $\lambda=532$ nm as the wavelength of the second harmonic wave of Nd: YAG laser and $\lambda_s=660$ nm as the oscillation wavelength of a semiconductor laser for DVD are given, when the retardation value is Rd=2.5×$\lambda$ (i.e., m=2), Rd=2×$\lambda_s$ (i.e., k=2).

Further, assuming that $\lambda=430$ nm as the wavelength of the harmonic wave of a semiconductor laser of the oscillation wavelength of 860 nm and $\lambda_s=650$ nm as the oscillation wavelength of a semiconductor laser for DVD are given, when the retardation value is Rd=1.5×$\lambda$ (i.e., m=1), Rd=$\lambda_s$ (i.e., k=1).

By using such polymer liquid crystal films and half-wave plates with respect to the wavelength $\lambda$, light having a wavelength $\lambda$ passing through the phase plate is parted into an A polarized light and a B polarized light as described before. However, the polarization of light of wavelength $\lambda_s$ passing through the phase plate is unchanged, and therefore it is not separated into two. As a result, in the light of wavelength $\lambda_s$ passing through the phase plate, the focused spot of light in response to the numerical aperture of an objective lens can be obtained.

Second Embodiment of Optical Data Recording/Reproducing Device

As a second embodiment of the optical data recording/reproducing device of the present invention, an optical data recording/reproducing device D2 to which the phase plate P5 according to the fifth embodiment of the phase plate is applied will be described with reference to FIG. 10. The device D2 is different from the optical data recording/reproducing device D1 shown in FIG. 9 in the following point.

In the light path between the polarizing beam splitter 116 as a beam combining means and the phase plate P5, a beam splitter 123 (DMP) having wavelength-selectivity as a color beam combining means which allows to transmit light of wavelength $\lambda$ as an object light or a reference light and reflects light of wavelength $\lambda_s$ ($\lambda_s \neq \lambda$) non-sensitive to the optical recording medium 10, is located to make the optical axis of the incident light of wavelength $\lambda_s$ to be in agreement with the optical axis of the incident light of wavelength $\lambda$ so that the aligned incident lights are focused on the light reflection layer of the optical recording medium 10 by means of the objective lens 118.

Here, the light of wavelength $\lambda_s$ is emitted as a P polarized light from a light source 124; is passed through a polarizing beam splitter 125 and a quarter-wave plate 126 by which it is rendered to be a circularly polarized light; then, it is rendered to be a parallel light by a collimator lens 127 and is incident into the beam splitter 123 having wavelength-selectivity.

On the other hand, the light reflected at the light reflection layer in the optical recording medium 10 travels in the original light path to pass through the quarter-wave plate 126 by which it is rendered to be an S polarized light, and the S polarized light is reflected at a polarizing beam splitter 125 and focused on the light receiving plane of a photodetector 128.

Here, since the phase plate P5 does not change the state of polarization of the transmitting light of wavelength $\lambda_s$, various known focus servo methods and tracking servo methods used for the conventional optical head devices can be employed.

As a result, an interference pattern can be formed stably in a specified region of the optical recording medium 10.

First Embodiment of Polarizing Beam Splitter

Figure 11:
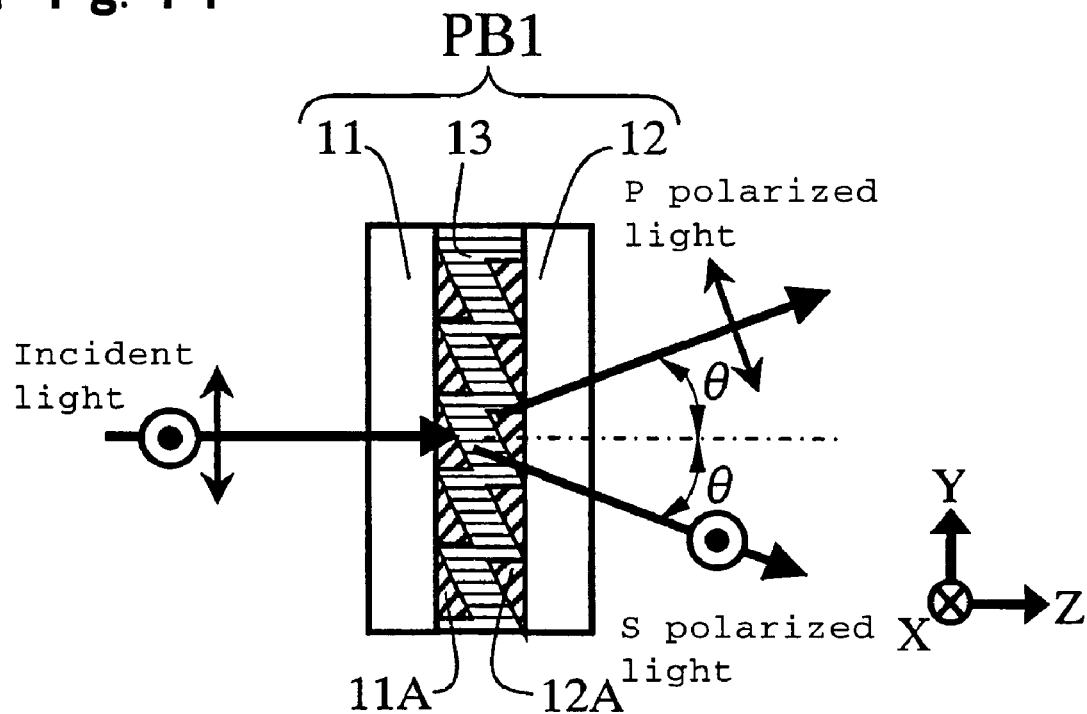
FIG. 11 is a cross-sectional view showing a constructional example of a first embodiment of the polarizing beam splitter according to the present invention.

FIG. 11 is a cross-sectional view of a polarizing beam splitter PB1 as a first embodiment of the polarizing beam splitter used in the optical data recording/reproducing device of the present invention. This polarizing beam splitter PB1 comprises transparent substrates 11, 12, polymer liquid crystal layers 11A, 12A provided between the transparent substrates 11, 12 and a homogeneous refractive index transparent material 13.

In this polarizing beam splitter PB1, an alignment layer is formed on each single surface of the transparent substrates 11, 12, the alignment layers are subjected to an aligning treatment and liquid crystal monomer is coated thereon followed by polymerization whereby polymer liquid crystal layers 11A having an ordinary refractive index $n_o$ and an extraordinary refractive index $n_e$ ($n_e > n_o$) are formed. In this case, the alignment layer on the transparent substrate 11 is subjected to an aligning treatment so that the direction of polymer liquid crystal 11A, 12A is aligned in an X axis direction, namely, the direction of the extraordinary refractive index coincides with the X axis. On the other hand, the alignment layer on the transparent substrate 12 is subjected to an aligning treatment so that the direction of polymer liquid crystal 12A is aligned in a Y axis direction, namely, the direction of the extraordinary refractive index coincides with the Y axis.

Then, these polymer liquid crystal layers 11A, 12A are processed by photolithography and reactive ion etching to form blazed diffraction gratings each having a shape of saw-tooth-like grating in cross-section and a grating constant (pitch) L and a homogeneous refractive index transparent material having a refractive index $n_s$ equivalent to the ordinary refractive index $n_o$ is filled in the recessed portions of the polymer liquid crystal layers to form a homogeneous refractive index transparent material 13, and at the same time, the transparent substrate 1 and the transparent substrate 2 are bonded.

The saw-tooth-like gratings of the polymer liquid crystal layers 11A, 12A are in such relation that either is rotated by 180° around the X axis with respect to the other as shown in FIG. 11. The height d of each of the saw-tooth-like polymer liquid crystal layers 11A, 12A with respect to an incident light of wavelength λ is preferably $d=\lambda/(n_e-n_s)$ so that the +1st order diffraction light becomes maximal.

In case that the blazed diffraction grating having a saw-tooth-like shape is approximated by a step-like shape having N steps (N is an integer of at least 3), the height of the polymer liquid crystal layer to maximize the +1st diffraction light corresponds to $d=\{(N-1)/N\}\times\lambda/(n_e-n_s)$.

When such structure is employed and a P polarized light as an ordinary polarized light with respect to the polymer liquid crystal layer 11A is incident, the incident light transmits straightly through the blazed diffraction grating of the polymer liquid crystal layer 11A without being diffracted because the refractive index of the polymer liquid crystal layer 11A agrees with the refractive index of the homogeneous refractive index transparent material 13.

On the other hand, since the P polarized light is an extraordinary polarized light with respect to the polymer liquid crystal layer 12A, the maximum diffraction light is generated in the direction of an angle θ (in the +Y axis direction with respect to the Z axis) satisfying $\sin\theta=\lambda/L$ by means of the blazed diffraction grating due to the difference of refractive indices between the polymer liquid crystal layer 12A and the homogeneous refractive index transparent material 13. In the formula, λ is in the wavelength of the incident light and L is the grating constant (pitch).

Further, when the S polarized light as an extraordinary polarized light with respect to the polymer liquid crystal layer 11A is incident into the beam splitter, the maximum diffraction light is generated in the direction of an angle θ (the −Y axis direction with respect to the Z axis) satisfying $\sin\theta=\lambda/L$ by means of the blazed diffraction grating due to the difference of refractive indices between the polymer liquid crystal layer 11A and the homogeneous refractive index transparent material 13.

On the other hand, since the S polarized light is an ordinary polarized light with respect to the polymer liquid crystal layer 12A and the refractive index of the polymer liquid crystal layer 12A agrees with the refractive index of the homogeneous refractive index transparent material 13, the incident light transmits straightly through the blazed diffraction grating of the polymer liquid crystal layer 12A without being diffracted.

The polarizing beam splitter PB1 is a flat plate type polarizing beam splitter wherein a P polarized light component incident into the polarizing beam splitter PB1 is diffracted at an angle θ in a direction of +Y axis while an S polarized light component is diffracted at an angle θ in a direction of −Y axis so that the P polarized light and S polarized light have their polarization directions with a separation angle 2θ.

According to the polarizing beam splitter PB1 of this embodiment, the thickness of the device can significantly be reduced in comparison with the conventional polarizing beam splitter formed by bonding prisms and can increase the separation angle of polarized lights in comparison with the conventional flat plate type polarizing beam splitter.

The above-mentioned explanation concerns the case that the polymer liquid crystal layers 11A, 12A are processed to have the same grating constant (pitch). However, the grating constant (pitch) may be changed so that the diffraction angle of the P polarized light is different from the diffraction angle of the S polarized light when an incident light enters. Further, the saw-tooth-like gratings of the polymer liquid crystal layers 11A, 12A may be approximated by gratings having a step-like shape.

Second Embodiment of Polarizing Beam Splitter

Now, explanation will be made as to a second embodiment of the polarized beam splitter used in the optical data recording/reproducing device of the present invention.

Figure 12:
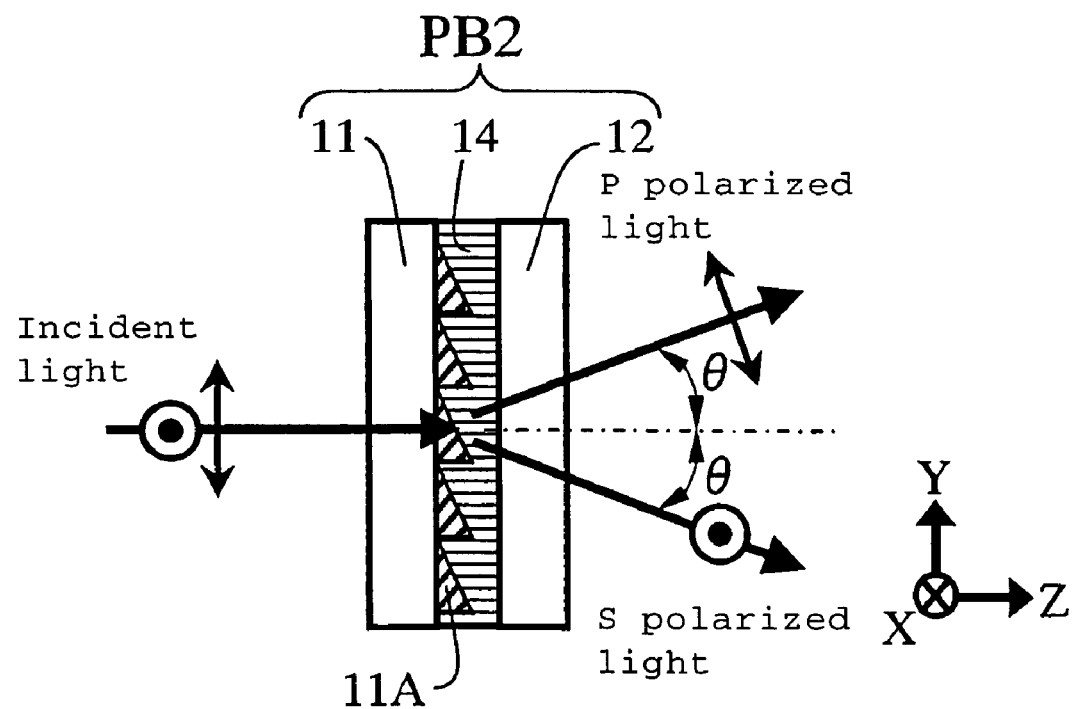
FIG. 12 is a cross-sectional view showing a constructional example of a second embodiment of the polarizing beam splitter according to the present invention.

FIG. 12 is a cross-sectional view of a polarizing beam splitter PB2 according to the second embodiment of the present invention. The polarizing beam splitter PB2 is the same as the polarizing beam splitter PB1 in that the polymer liquid crystal layer 11A having an ordinary refractive index $n_o$ and an extraordinary refractive index $n_e$ ($n_e > n_o$) is formed on a single surface of a transparent substrate 11 and a blazed diffraction grating having a saw-tooth-like shape in cross-section and having a grating constant (pitch) L is formed by processing, but is different from the polarizing beam splitter PB1 in that the refractive index $n_s$ of the homogeneous refractive index transparent material to be filled in the recessed portions of the polymer liquid crystal layer 11A to form a homogeneous refractive index transparent material 14 is rendered to be an averaged refractive index $(n_e+n_o)/2$ between the ordinary refractive index $n_o$ and the extraordinary refractive index $n_e$. Further, it has an additional different point that no polymer liquid crystal layer is formed on the transparent substrate 12.

In the polarizing beam splitter having such structure, when a P polarized light being an ordinary polarized light with respect to the polymer liquid crystal layer 11A is incident into the beam splitter, the maximum diffraction light is generated in the direction of an angle θ (the direction of +Y axis with respect to the Z axis) satisfying the above-mentioned $\sin\theta=\lambda/L$ by means of the blazed diffraction grating due to the difference of the refractive indices between the polymer liquid crystal layer 11A and the homogeneous refractive index transparent material 14.

On the other hand, even in a case of entering an S polarized light being an extraordinary polarized light with respect to the polymer liquid crystal layer 11A, the maximum diffraction light is generated in the direction of an angle θ (the direction of −Y axis with respect to the Z axis) satisfying the above-mentioned sin θ=λ/L by means of the blazed diffraction grating due to the difference of the refractive indices between the polymer liquid crystal layer 11A and the homogeneous refractive index transparent material 14.

Thus, a flat plate type polarizing beam splitter can be provided wherein the P polarized light component incident into the polarizing beam splitter PB2 is diffracted at the angle θ in the direction of +Y axis while the S polarized light component is diffracted at the angle θ in the direction of −Y axis whereby their polarization directions form a separation angle 2θ.

Accordingly, it is necessary that the height d of the polymer liquid crystal layer 11A having a saw-tooth-like shape has a greater value than that of the polarizing beam splitter PB1 because the refractive index $n_s$ of the homogeneous refractive index transparent material 14 is larger. However, the manufacturing process can be simplified because the blazed diffraction grating can be processed only once.

Third Embodiment of Polarizing Beam Splitter

Now, description will be made as to a third embodiment concerning a polarizing beam splitter used in the optical data recording/reproducing device of the present invention.

Figure 13:
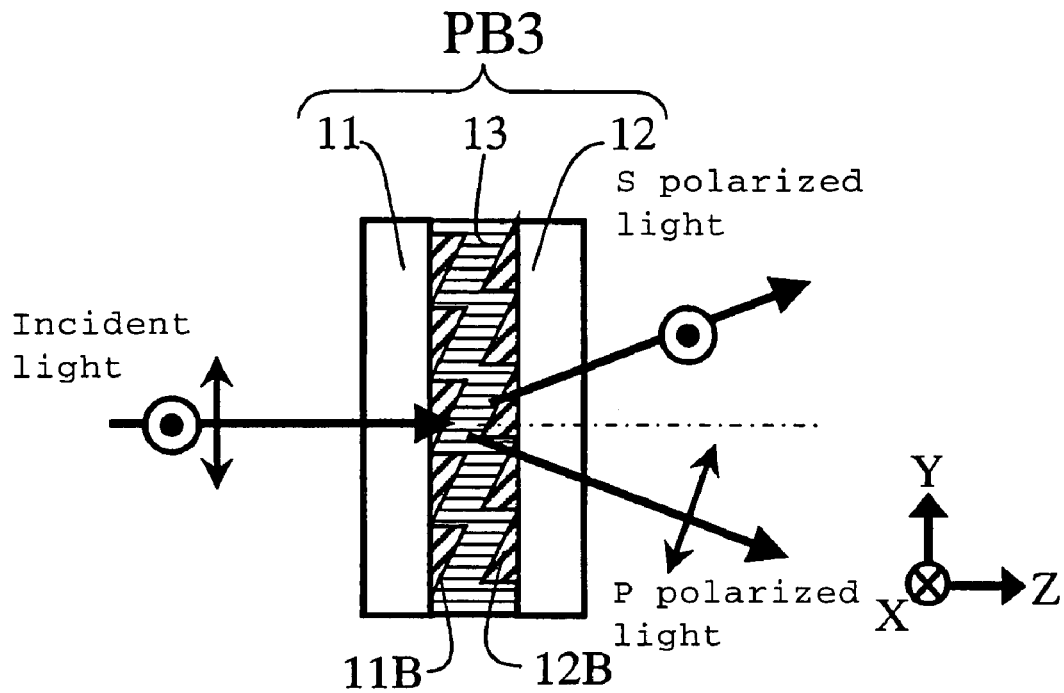
FIG. 13 is a cross-sectional view showing a constructional example of a third embodiment of the polarizing beam splitter according to the present invention.

FIG. 13 is a cross-sectional view of a polarizing beam splitter PB3 as a third embodiment of the present invention. This polarizing beam splitter PB3 is the same as the polarizing beam splitter PB1 shown in FIG. 11 except that polymer liquid crystal layers 11B and 12B are formed so that the directions of inclined surfaces of the saw-tooth-like blazed diffraction gratings in the polymer liquid crystal layers 11A, 12A are reversed with respect to the Y axis.

With such construction, the directions of diffraction of the P polarized light and the S polarized light are exchanged as shown in FIG. 13. The same effect can be obtained by conducting an aligning treatment to an alignment layer on a transparent substrate 11 so that the direction of the polymer liquid crystal aligns in the Y axis, namely, the direction of the extraordinary refractive index $n_e$ coincides with the Y axis, and conducting an aligning treatment to an alignment layer on a transparent substrate 12 so that the direction of the polymer liquid crystal aligns in the X axis direction, namely, the direction of the extraordinary refractive index $n_e$ coincides with the X axis. Here, reference numeral 13 designates a homogeneous refractive index transparent material.

Fourth Embodiment of Polarizing Beam Splitter

Now, description will be made as to a fourth embodiment concerning a polarizing beam splitter used in the optical data recording/reproducing device of the present invention.

Figure 14:
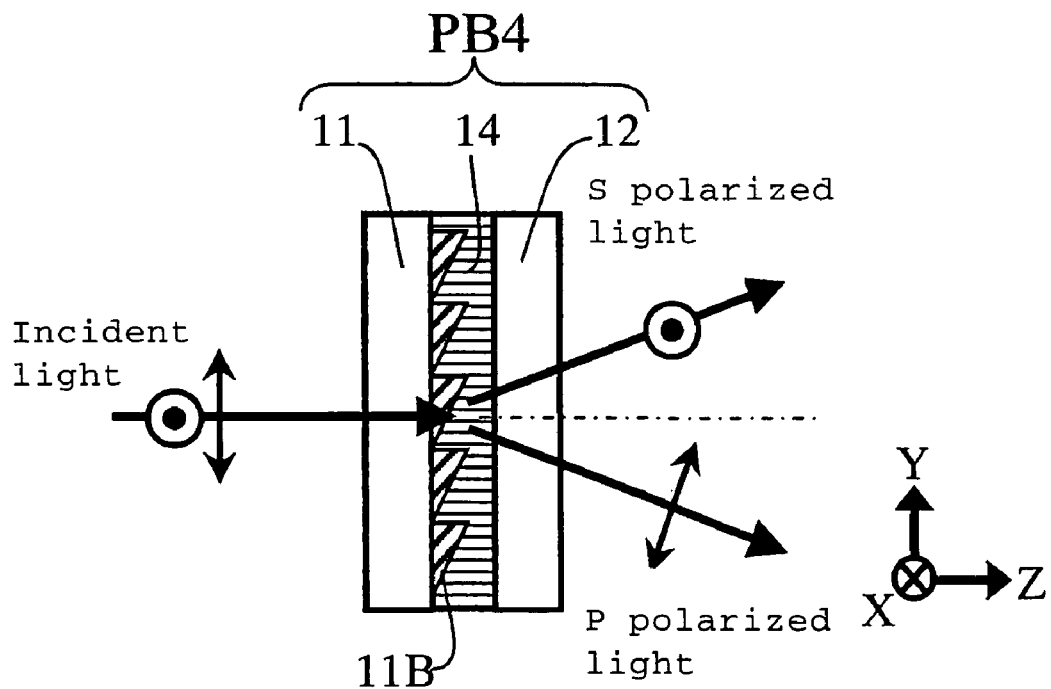
FIG. 14 is a cross-sectional view showing a constructional example of a fourth embodiment of the polarizing beam splitter according to the present invention.

FIG. 14 is a cross-sectional view of a polarizing beam splitter PB4 as a fourth embodiment of the present invention. This polarizing beam splitter PB4 is the same as the polarizing beam splitter PB2 shown in FIG. 12 except that the polymer liquid crystal layer 11B is formed so that the direction of inclined surface of the saw-tooth-like blazed diffraction grating in the polymer liquid crystal layer 11A is reversed with respect to the Y axis. With such construction, the directions of diffraction of the P polarized light and the S polarized light as shown in FIG. 12 are exchanged as shown in FIG. 14. The same effect can be obtained by conducting an aligning treatment to an alignment layer on a transparent substrate 11 so that the direction of alignment of the polymer liquid crystal aligns in the Y axis direction, namely, the direction of the extraordinary refractive index coincides with the Y axis.

Here, reference numerals 12 and 14 designate the same optical elements as those in FIG. 12.

Third Embodiment of Optical Data Recording/Reproducing Device

In the following, a third embodiment of the optical data recording/reproducing device of the present invention will be described.

The optical data recording/reproducing device D3 in this embodiment of the present invention employs the flat plate type polarizing beam splitters PB1 to PB4 described before, which are also according to the present invention. The optical data recording/reproducing device is adapted to record an interference pattern, as data, in the optical recording layer in an optical recording medium and to reproduce the recorded interference pattern, as recorded data, by irradiating a reproducing light, the interference pattern being formed by the interference of an irradiated object light and an irradiated reference light in a disk-like optical recording medium having the optical recording layer and the optical reflection layer. This embodiment will be described using constructional diagrams of FIGS. 15 and 16.

Figure 15:
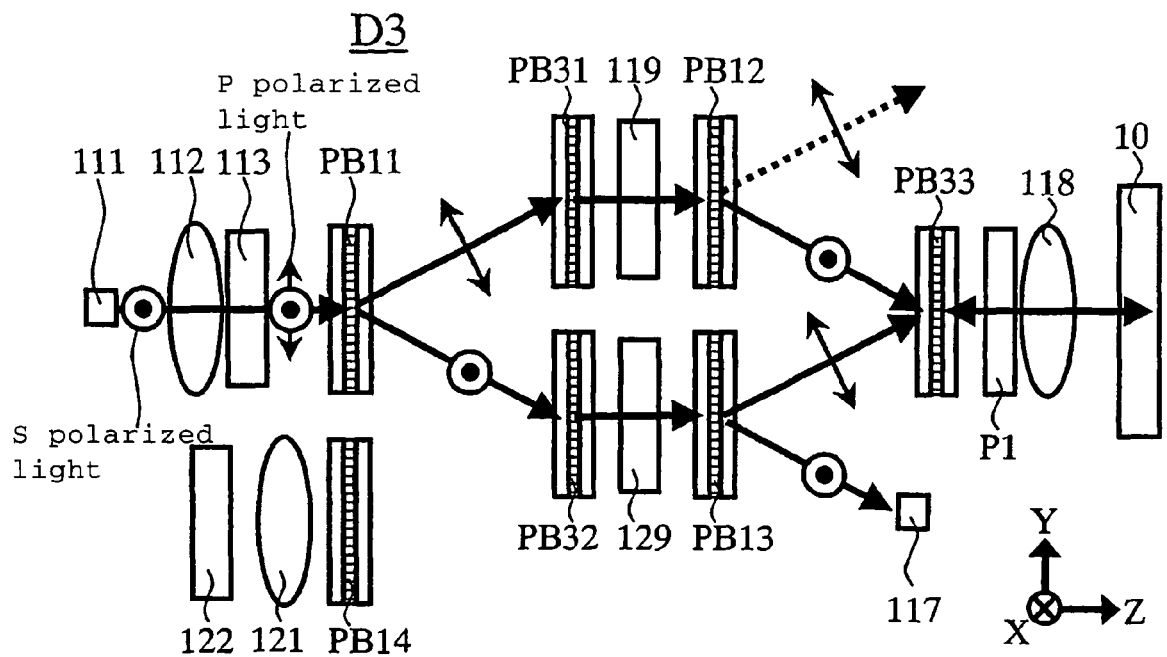
FIG. 15 is an explanatory diagram for explaining the principle of recording in a third embodiment of the optical data recording/reproducing device mounting thereon a polarizing beam splitter according to the present invention.

FIG. 15 shows the optical data recording/reproducing device D3 according to the third embodiment of the present invention wherein the optical data recording/reproducing device D3 comprises a light source 111, a collimator lens 112, a half-wave plate 113 as an optical rotation element, a spatial light modulating element 119, a liquid crystal device 129, a phase plate P1, an objective lens 118, an image focusing lens 121 and an image pickup device 122.

It further comprises polarizing beam splitters (PBS) PB11, PB12, PB13 and PB14 as flat plate type polarizing beam splitters each having the same structure as the polarizing beam splitter (PBS) PB1 in the first embodiment of the polarizing beam splitter of the present invention so that a P polarized light in an incident light incident in a +Z direction is diffracted in an angular direction of counterclockwise rotation and an S polarized light is diffracted in an angular direction of clockwise rotation.

It further comprises polarizing beam splitters (PBS) PB31, PB32 and PB33 as flat plate type polarizing beam splitters each having the same structure as the polarizing beam splitter PB3 concerning the third embodiment of the polarizing beam splitter of the present invention so that a P polarized light in an incident light incident in a +Z direction is diffracted in an angular direction of clockwise rotation and an S polarized light is diffracted in an angular direction of counterclockwise rotation.

Here, description is made on the assumption that the grating constants (pitches) of the polarizing diffraction gratings constituting the flat-plate type polarizing beam splitters are the same.

(I) Now, explanation will be made using FIG. 15 showing the optical data recording/reproducing device D3 as to how an interference pattern generated by the interference of an object light and a reference light irradiated to an optical recording medium 10 is recorded as data in the optical recording layer of the optical recording medium.

A linearly polarized light (S polarized light) emitted from the light source 111 is rendered to be a parallel light by the collimator lens 112, the parallel light is converted into the light containing an S polarized light component and the light containing a P polarized light component by, for instance, the half-wave plate 113 as an optical rotation element wherein the ratio of the P polarized light component to the S polarized light component to be incident into the polarizing beam splitter PB11 is adjusted.

In the polarized light components, the P polarized light component diffracted by the polarizing beam splitter PB11 is introduced into the polarizing beam splitter PB31 and is diffracted by the polarizing beam splitter PB31 to be introduced into the spatial light modulating element 119.

Here, as the spatial light modulating element 119, a liquid crystal display device capable of changing the retardation value of the liquid crystal layer in response to a voltage applied to the liquid crystal layer for each pixel to change the state of polarization of transmitting light, is used for example. It serves as a half-wave plate when no voltage is applied, so that a P polarized light incident into it emits as an S polarized light. On the other hand, when a voltage is applied to the device, it serves as a transparent plate having a retardation value of 0 so that the transmitting light maintains a P polarization. Thus, the spatially light modulating element 119 functions as a voltage-controlling wave plate.

Thus, the light transmitting through the spatial light modulating element 119 in a spatial pattern of S and P polarized lights with the result of voltages applied to pixels is diffracted so that the P polarized light component in the polarized light components incident into the polarizing beam splitter PB12 is diffracted so as not to be incident into the polarizing beam splitter PB33 while the S polarized light component is diffracted so as to be incident into the polarizing beam splitter PB33.

As a result, the S polarized light component has a diffraction light intensity depending on the quantity of the S polarized light component for each pixel of the spatial light modulating element 119 to form a data-carrying object light having a two-dimensional pattern of brightness and darkness. The S polarized light component as an object light is diffracted by the polarizing beam splitter PB33 and focused onto the optical recording medium 10 by means of the objective lens 118 through the phase plate P1.

On the other hand, the S polarized light component diffracted by the polarizing beam splitter PB11 is diffracted by the polarizing beam splitter PB32 and is introduced into the liquid crystal device 129 functioning as a voltage controlling wave plate. This liquid crystal device 129 serves as a half-wave plate so that an S polarized light as incident light emits as a P polarized light when no voltage is applied to the liquid crystal layer. On the other hand, the liquid crystal device serves as a transparent plate having a retardation value of 0 when a predetermined or higher voltage is applied thereto whereby the transmitting light maintains the S polarization. When an intermediate voltage is applied to the liquid crystal layer, an elliptically polarized light with mixed P and S polarized lights is emitted.

Accordingly, when an interference pattern by an object light and a reference light is recorded as data in the optical recording medium 10, no voltage should be applied to the liquid crystal device 129 so that it serves as a half-wave plate whereby transmitting light is converted to a P polarized light. The P polarized light component is diffracted by the beam splitter PB13 to be incident into the polarizing beam splitter PB33. The P polarized light component incident into the polarizing beam splitter PB33 is diffracted herein and is focused as a reference light onto the optical recording medium 10 by means of the objective lens 118 through the phase plate P1.

Accordingly, the S polarized light component as an object light and the P polarized light component as a reference light are aligned on the same optical axis and are focused onto the optical recording medium by means of the objective lens 118 through the phase plate P1. As a result, an interference pattern generated by the object light and the reference light by the function of the phase plate P1 of the optical data recording/reproducing device is recorded in the optical recording medium 10.

Figure 16:
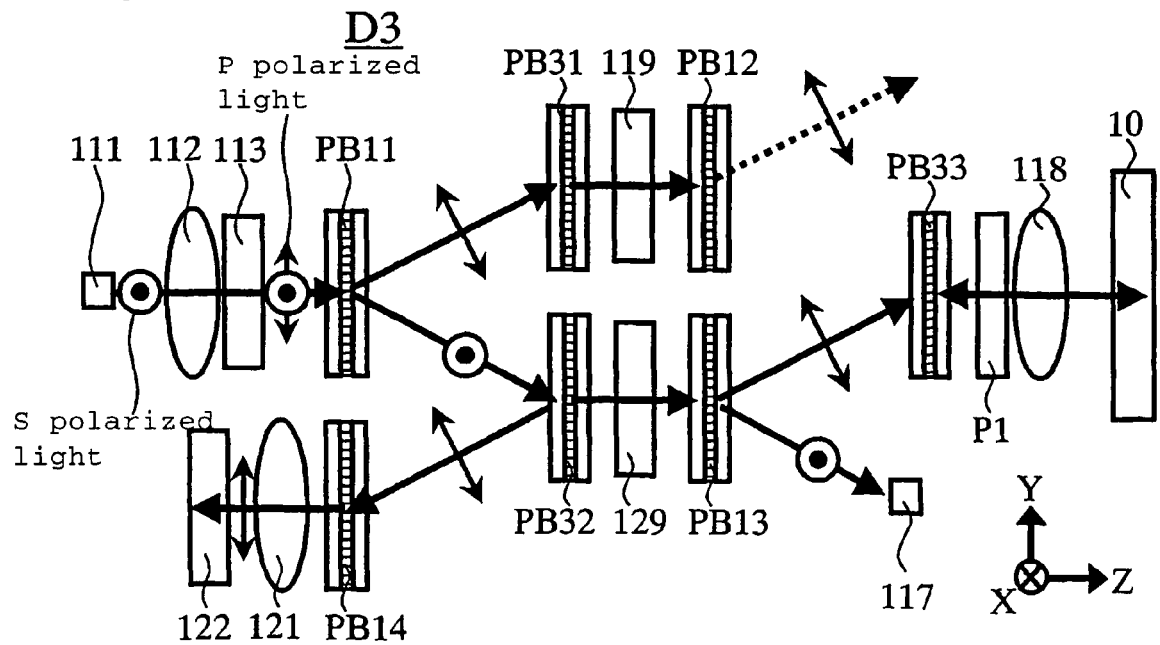
FIG. 16 is an explanatory diagram for explaining the principle of reproducing in a third embodiment of the optical data recording/reproducing device mounting thereon a polarizing beam splitter according to the present invention.

(II) Then, explanation is made using FIG. 16 indicating the optical data recording/reproducing device D3 of the present invention as to how the data recorded as interference patterns in the optical recording medium 10 are reproduced.

Unlike the case of recording data, when the data is to be reproduced, a voltage is applied to all pixels in the liquid crystal display device as the spatial light modulating element 119 to reset the retardation value of the liquid crystal layer to be 0. As a result, light transmitting the spatial light modulating device 119, keeping the state of P polarized light, is incident into the polarizing beam splitter PB12. Accordingly, the transmitting light is diffracted by the polarizing beam splitter PB12 so as not to be incident into the polarizing beam splitter PB33. As a result, no data carrying object light is introduced into the optical recording medium 10.

Further, in the reproducing of data, the voltage applied to the liquid crystal device 129 serving as a voltage-controlling wave plate is adjusted so that the S polarized light component incident into the liquid crystal device 129 is converted into an emission light having an S polarized light component and a P polarized light component. As a result, the P polarized light component in the light passing through the liquid crystal device 129 is diffracted by the polarizing beam splitter PB13 in the direction entering into the polarizing beam splitter PB33. The P polarized light component diffracted by the polarizing beam splitter PB33 is focused as a reproducing light for data reproduction onto the optical recording medium 10 by means of the objective lens 118 through the phase plate P1.

When the reproducing light is incident into the optical recording medium 10, it is diffracted by the interference pattern recorded in the optical recording medium 10 to produce a data light. This data light travels in the opposite direction to the reproducing light and is incident as a P polarized light into the polarizing beam splitter PB33 along the light path through the objective lens 118 and the phase plate P1.

Then, the P polarized light incident into the polarizing beam splitter PB33 is diffracted to be incident into the polarizing beam splitter PB13. The P polarized light is further diffracted by the polarizing beam splitter PB13 to be incident into the liquid crystal device 129.

The P polarized light incident into the liquid crystal device 129 is converted into a P polarized light component and an S polarized light component to be incident into the polarizing beam splitter PB32. In the converted light components, the P polarized light component is diffracted by the polarizing beam splitter PB32 and is incident into the polarizing beam splitter PB14. The P polarized light component is further diffracted by the polarizing beam splitter PB14 to be incident into the image pickup element 122 such as a CCD array or the like by means of the image focusing lens 121. Thus, a picture image produced in the spatial light modulating element 119 can be reproduced.

FIGS. 15 and 16 show a constructional example wherein the flat plate type polarizing beam splitters are located in isolation. However, each group of polarizing beam splitters PB11 and PB14, polarizing beam splitters PB31 and PB32 and polarizing beam splitters PB12 and PB13 may be formed integrally to reduce the number of constituent parts, whereby the optical data recording/reproducing device has a simplified structure having four polarizing beam splitters.

Further, in the flat plate type polarizing beam splitter of the present invention, the blazed diffraction grating made of a polymer liquid crystal layer can be formed with high accuracy by photolithography and reactive ion etching whereby a stable beam separation angle is obtainable. As a result, the optical data recording/reproducing device having stable characteristics can be realized in comparison with an optical data recording/reproducing device with the conventional polarizing beam splitter PB5 formed by bonding prisms.

Figure 21:
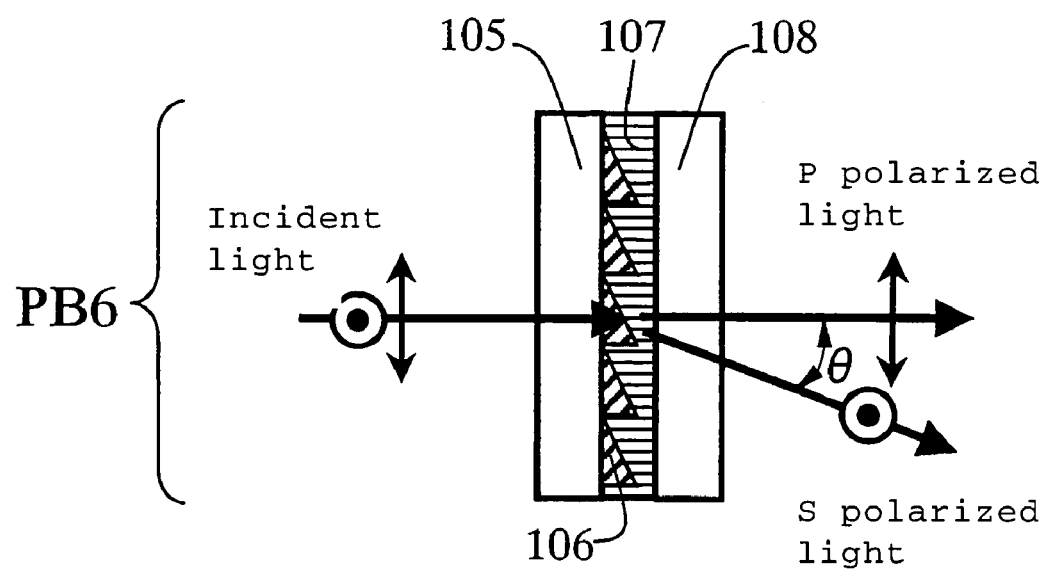
FIG. 21 is a cross-sectional view showing a constructional example of a conventional flat plate type polarizing beam splitter.

Further, in the flat plate type polarizing beam splitter of the present invention, it is possible to form a larger beam separation angle between P and S polarized lights than that of the conventional flat plate type polarizing beam splitter PB6 shown in FIG. 21. Accordingly, light can be irradiated effectively to the display region of the spatial light modulating element 119 shown in FIG. 15, and therefore, it is possible to reduce the distance between polarizing beam splitters. As a result, a miniaturized optical data recording/reproducing device is possible.

Figure 10:
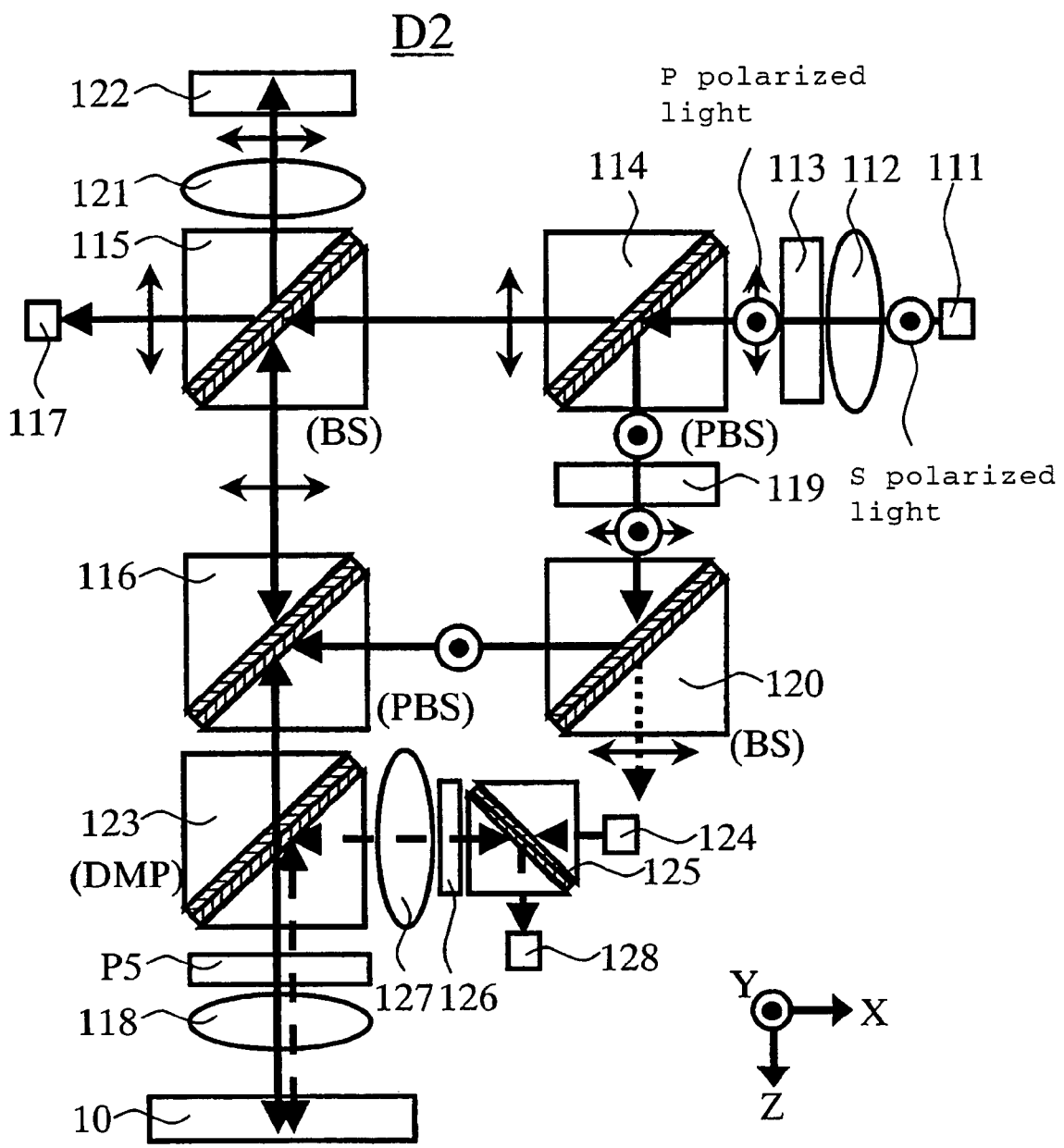
FIG. 10 is an explanatory diagram showing a second embodiment of the optical data recording/reproducing device according to the present invention.

Further, in the same manner as the optical data recording/reproducing device D2 shown in FIG. 10, the color beam combining means (DMP) can be located in the light path between the polarizing beam splitter PB33 and the phase plate P1 in the optical data recording/reproducing device D3 to combine the light of wavelength $\lambda_s$ different from the light of wavelength $\lambda$ for recording or reproducing the interference pattern so that known focus servo method and tracking servo method can be employed.

In the following, some examples will be described.

EXAMPLE 1

The phase plate P1 described as the first embodiment of the phase plate will be explained specifically with reference to FIG. 1 (cross-sectional view) and FIG. 2 (plane view).

(1) A polymer liquid crystal film 2 is formed on a single surface of a glass substrate (corresponding to the transparent substrate 1) by forming a polyimide film for an alignment layer, conducting an aligning treatment to it so that liquid crystal monomer having an anisotropy refractive index is aligned in a direction of +22.5° with respect to the X axis in FIG. 2, and irradiating ultraviolet rays to polymerize the liquid crystal monomer. Here, determination is made so that the angular orientation in a clockwise direction from the +X axis to the +Y axis is positive. Then, the polymer liquid crystal film 2 is a polymer liquid crystal film having a film thickness of 2.22 μm and having an ordinary refractive index $n_o$=1.55 and an extraordinary refractive index $n_e$=1.67, being in parallel to the surface of the glass substrate (transparent substrate 1) and having the molecules aligned in the direction of film thickness.

(2) Similarly, a polymer liquid crystal film 2 is formed on a single surface of a glass substrate (corresponding to the transparent substrate 4) aligned in a direction of −22.5° with respect to the X axis in FIG. 2, having a film thickness of d=2.22 μm and having an ordinary refractive index $n_o$=1.55 and an extraordinary refractive index $n_e$=1.67. In this case, the polymer liquid crystal film formed on each glass substrate has a retardation value of $(n_e-n_o) \times d$=0.266 μm and serves as a half-wave plate with respect to light having a wavelength of $\lambda$=532 nm (0.532 μm).

(3) Then, patterning is conducted by photolithography and reactive ion etching to remove a right half portion of the polymer liquid crystal film 2 on the glass substrate (transparent substrate 1) and a left half portion of the polymer liquid crystal film 2 on the glass substrate (transparent substrate 4).

(4) Further, by using an adhesive (the homogeneous refractive index transparent material 3) having a refractive index $n_s$=1.55, the glass substrates (transparent substrates 1, 4) are positioned so that the border lines of the processed portions of polymer liquid crystal films 2L, 2R meet with respect to the X axis direction as shown in FIG. 1, and the glass substrates are bonded by filling the adhesive (homogeneous refractive index transparent material 3) therebetween, whereby the two-parted phase plate P1 is formed.

When a linearly polarized light (S polarized light) having a wavelength $\lambda$=532 nm and polarized in the Y axis direction is incident vertically (i.e. in a +Z axis direction to the thus formed phase plate P1, the emission light passing through the portion of polymer liquid crystal film 2L becomes a B polarized light having a polarization direction of +45° as shown in FIG. 3(A). On the other hand, the emission light passing through the portion of polymer liquid crystal film 2R becomes an A polarized light having a polarization direction of −45° as shown in FIG. 3(B). Thus, the linearly polarized incident light is converted into linearly polarized lights crossing mutually at a right angle.

Further, when a linearly polarized light (P polarized light) having a wavelength $\lambda$=532 nm and polarized in the X axis direction is incident into a +Z axis direction, the emission light passing through the portion of polymer liquid crystal film 2L becomes an A polarized light having a polarization direction of +45° as shown in FIG. 4(A). On the other hand, the emission light passing through the portion of polymer liquid crystal film 2R becomes a B polarized light having a polarization direction of −45° as shown in FIG. 4(B). Thus, the incident light is converted into linearly polarized lights crossing mutually at a right angle.

Thus, there is no displacement of position at the border line of the two-parted regions, and therefore, good characteristics at the region of two parted border line can be kept, and the phase plate P1 of one-piece structure having reduced size and light weight can be realized. Further, even in a case that an incident light enters into the phase plate P1 at a certain angle deviated from the vertical direction, the state of polarization of the transmitting light does not substantially change, and therefore, a stable linearly polarized light is obtainable.

The optical data recording/reproducing device D1 mounting thereon the phase plate P1 shown in FIG. 9 has the same structure and performs the same function as those of the first embodiment of the optical data recording/reproducing device, and the basic function of recording and reproducing data to the optical recording medium 10 by this optical data recording/reproducing device is the same as that explained with reference to FIGS. 17 and 18. In this device, the second harmonic wave of Nd:YAG laser having a wavelength $\lambda$=532 nm is used as the light source 111.

By using the optical data recording/reproducing device D1 of this embodiment on which the phase plate P1 is mounted, the regions for transmitting polarized light components in the phase plate P1 can precisely parted, and a data recording/reproducing device of small size and light weight having a large stable recording capacity can be attained.

EXAMPLE 2

Then, the phase plate P5 shown in the fifth embodiment of the phase plate will be described specifically with reference to FIG. 7 (cross-sectional view).

In the same manner as in Example 1, a polymer liquid crystal film 5 having a film thickness of 6.65 μm, an ordinary refractive index $n_o$=1.55 and an extraordinary refractive index $n_e$=1.75 and being aligned in the direction of +22.5° with respect to the X axis, is formed on a single surface of a glass substrate (corresponding to the transparent substrate 1).

Similarly, a polymer liquid crystal film having a film thickness of d=6.65 μm, an ordinary refractive index $n_o$=1.55 and an extraordinary refractive index $n_e$=1.75 and being aligned in the X axis direction ($\Phi$=0°), is formed on a single surface of a glass substrate (corresponding to the transparent substrate 4), and this polymer liquid crystal film is subjected to patterning so as to remove a right half portion of the film to form a polymer liquid crystal film 6L.

Further, an adhesive (homogeneous refractive index transparent material 3) having a refractive index $n_s$=1.65 corresponding to the averaged refractive index of the ordinary refractive index $n_o$ and the extraordinary refractive index $n_e$ of the polymer liquid crystal film 6L is applied to the region where no polymer liquid crystal film 6L exists and at the same time, the glass substrates (transparent substrates 1, 4) are bonded together as shown in FIG. 7. Thus, the phase plate P5 to be mounted on the optical data recording/reproducing device shown in FIG. 10 is prepared.

The retardation values of the polymer liquid crystal films 5 and 6L formed on the glass substrates are respectively Rd=1330 nm which corresponds to 2.5$\lambda$ with respect to a wavelength $\lambda$=532 nm and 2.0$\lambda$ with respect to a wavelength $\lambda_s$=660 nm.

Accordingly, the polymer liquid crystal film 5 and the polymer liquid crystal film 6L serve as half-wave plates with respect to the wavelength $\lambda$=532 nm while they do not change the state of polarization of transmitting light with respect to the wavelength $\lambda_s$=660 nm, and therefore, they do not serve as phase plates.

When the phase plate P5 is mounted on the optical data recording/reproducing device to constitute the device D2 as shown in FIG. 10, the structure and operation of this device are the same as those of the optical data recording/reproducing device according to the second embodiment wherein the light source 111 for emitting the light of wavelength $\lambda$=532 nm as the second harmonic wave of the Nd:YAG laser is used and the light source 124 for emitting the semiconductor laser of wavelength $\lambda_s$=660 nm for DVD to which the optical recording medium 10 is not sensitive, is used.

When such phase plate P5 is used, the state of polarization of light passing through the phase plate P1 is changed, i.e., the light is parted into two parts: an A polarized light and a B polarized light in the same manner as the optical data recording/reproducing device D1 with respect to the wavelength $\lambda$, and therefore, it can be used for recording/reproducing of data to the optical recording medium 10.

On the other hand, the state of polarization of light passing through the phase plate P1 remains unchanged with respect to the wavelength $\lambda_s$, and a light focusing spot corresponding to the numerical aperture of the objective lens 118 is obtainable. When the light focusing spot is formed on the light reflection layer of the optical recording medium 10, the reflected light from the optical reflection layer is converged on the light receiving plane of the photodetector 128. Accordingly, if a cylindrical lens (not shown) is located at the light incident side of the photodetector 128 having four-divided light receiving plane, an astigmatism focus servo method can be employed.

Further, if tracking grooves are formed previously in the light reflection layer of the optical recording medium 10, a diffraction grating (not shown) for generating three beams is located at the light emission side of the light source 124 and a photodetector 128 having the light receiving plane for detecting three beams is used, a three-beam tracking servo method is applicable.

Accordingly, if the tracking servo method and the focus servo method for moving the objective lens 118 by an actuator (not shown) so that the light of wavelength $\lambda_s$ can be focused on a predetermined position of the light reflection layer of the optical recording medium 10, it is possible to record stably data as an interference pattern formed by the light of wavelength $\lambda$ in a specified region of the optical recording medium 10 or to reproduce stably the recorded data as the interference pattern in the optical recording medium.

EXAMPLE 3

Next, the polarizing beam splitter PB1 according to the first embodiment of the polarizing beam splitter used in the optical data recording/reproducing device of the present invention will be described specifically by using the cross-sectional view of FIG. 11.

An alignment layer is formed on a single surface of a glass substrate (transparent substrate 11), the alignment layer is subjected to an aligning treatment in an X axis direction, and liquid crystal monomer is coated thereon followed by polymerizing, whereby a polymer liquid crystal layer 11A having an ordinary refractive index $n_o$=1.55 and an extraordinary refractive index $n_e$=1.75 and having a film thickness of 2.33 μm wherein the polymer liquid crystal is aligned in an X axis direction along the surface of the glass substrate, is formed.

Similarly, an alignment layer is formed on a single surface of a glass substrate (transparent substrate 12), the alignment layer is subjected to an aligning treatment in a Y axis direction, and liquid crystal monomer is coated thereon followed by polymerizing, whereby a polymer liquid crystal layer 12A having an ordinary refractive index $n_o$=1.55 and an extraordinary refractive index $n_e$=1.75 and having a film thickness of 2.33 μm wherein the polymer liquid crystal is aligned in a Y axis direction along the surface of the glass substrate, is formed.

Then, photolithography and reactive ion etching are conducted to these polymer liquid crystal layers 11A, 12A to form blazed diffraction gratings each having a saw-tooth-like grating in cross-section and a grating constant (pitch) L (=5 μm). Then, an adhesive of homogeneous refractive index having a refractive index $n_s$=1.55 is filled in concave portions of each of the polymer liquid crystal layers to form a homogeneous refractive index transparent material 13 and at the same time, the glass substrate (transparent substrate 11) and the glass substrate (transparent substrate 12) are bonded together. Thus, the flat plate type polarizing beam splitter PB1 shown in FIG. 11 is formed. In this case, the saw-tooth-like grating of each of the polymer liquid crystal layers 11A, 12A is processed to have a shape approximated by a step-like grating having 8 steps, and the saw-tooth-like grating of either one of the polymer liquid crystal layers assumes the shape rotated by 180° from the other with respect to the X axis.

When a P polarized light is incident into the polarizing beam splitter PB1, the light passes through without being diffracted by the blazed diffraction grating 11A because the refractive index difference ($n_o-n_s$) between the polymer liquid crystal layer 11A and the homogeneous refractive index transparent material 13 is zero. On the other hand, the refractive index difference ($n_e-n_s$) between the polymer liquid crystal layer 12A and the homogeneous refractive index adhesive 13 is 0.20 and the maximum light path length ($n_e-n_s$)×d is 0.466 μm. Then, the +1st order diffraction efficiency of the blazed diffraction grating 12A with respect to an incident light having a wavelength of 532 nm (0.532 μm) is about 80%, and the light is diffracted upward at an angle θ of diffraction of θ=sin$^{-1}$($\lambda$/L)=6.1° as shown in FIG. 11.

On the other hand, when an S polarized light is incident into the polarizing beams splitter PB1, the refractive index difference ($n_e-n_s$) between the polymer liquid crystal layer 11A and the homogeneous refractive index adhesive 13 is 0.20 and the maximum light path length $(n_e-n_s) \times d$ is 0.466 µm. The +1st order diffraction efficiency of the blazed diffraction grating 11A with respect to an incident light having a wavelength of 532 nm (0.532 µm) is about 80%, and the light is diffracted downward at an angle θ of diffraction of $\theta = \sin^{-1}(\lambda/L) = 6.1°$ as shown in FIG. 11. In this case, the refractive index difference $(n_o-n_s)$ between the polymer liquid crystal layer 12A and the homogeneous refractive index adhesive 13 is zero. Accordingly, the light passes through the beam splitter without being diffracted by the blazed diffraction grating 12A.

Accordingly, the incident light to the polarizing beam splitter PB1 is parted into a P polarized light and an S polarized light at a separation angle of 12.2°.

Figure 20:
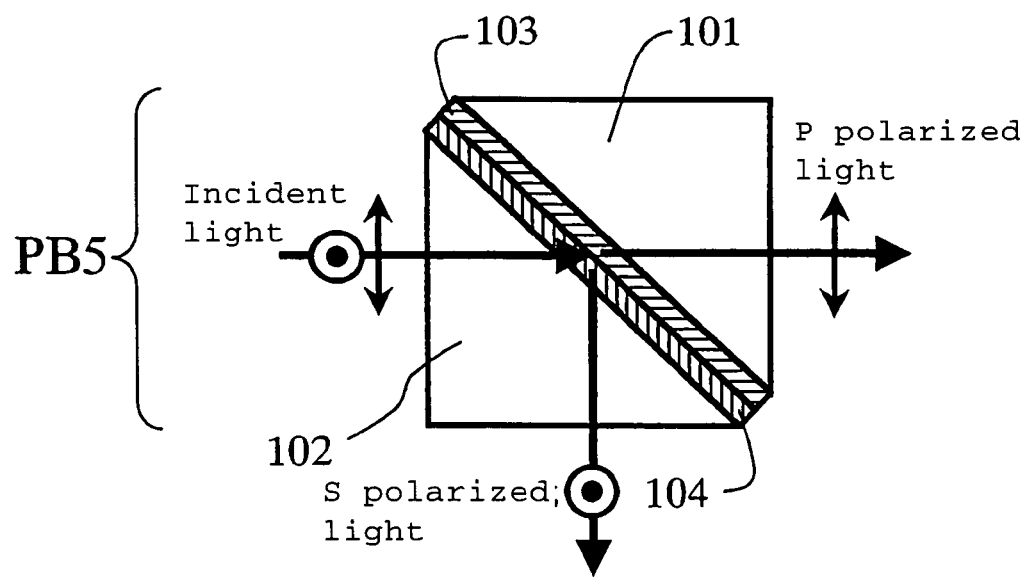
FIG. 20 is a cross-sectional view showing a constructional example of a conventional bonded-prism-type polarizing beam splitter.

As described before, when the conventional polarizing beam splitter PB5 with bonded prisms as shown in FIG. 20 is used, an effective area for an incident light is increased to thereby increase the thickness of the device whereby the volume and weight are increased. On the other hand, the flat plate type polarizing beam splitter of the present invention is of a thin type element despite the effective area for an incident light as described above. Accordingly, the polarizing beam splitter of reduced size and weight can be attained. Further, according to the flat plate type polarizing beam splitter of the present invention, the beam separation angle for P and S polarized lights can be made double in comparison with the conventional flat plate type polarizing beam splitter PB6 shown in FIG. 21.

Further, when the polarizing beam splitters PB11, PB12, PB13 and PB14 as the polarizing beam splitter PB1 prepared as described before and polarizing beam splitters PB31, PB32, PB33 as the polarizing beam splitter PB3 in which the shape of saw-tooth-like grating of either polymer liquid crystal layer is opposite to the other with respect to the X-Z plane as shown in FIG. 13 are used in the optical data recording/reproducing devices D3 shown in FIGS. 15 and 16, it is possible to reduce the size and weight of the optical recording/reproducing device for recording data as an interference pattern in the optical recording medium 10 or reproduce the recorded data as the interference pattern from the optical recording medium 10, and stable operations for recording/reproducing can be obtained.

Explanation in the third embodiment of the optical data recording/reproducing device can be used as to the function of recording and reproducing data in the optical recording medium.

INDUSTRIAL APPLICABILITY

As described above, the phase plate of the present invention has the same function as the two-parted optical rotation plate used essentially in the optical data recording/reproducing device. Since there is no positional displacement of the border line at the two-parted regions, there is no risk of deterioration of the characteristics at the region of two parted border, and the phase plate of single body, having a reduced size and a reduced weight can be formed. Further, since the angular dependence of the retardation value is small in comparison with the phase plate comprising a monocrystal material such as quartz or the like, the state of polarization of a transmitting light does not substantially change even when the incident light is deviated from the normal direction and therefore, stable linearly polarized light can be maintained.

Further, when the phase plate of the present invention is mounted on an optical data recording/reproducing device, a recording/reproducing device of reduced size and weight, capable of storing a large quantity of data of interference pattern, can be attained.

Further, the optical data recording/reproducing device mounted thereon the phase plate of the present invention allows to use light having a wavelength different from the wavelength used for recording and reproducing data of interference pattern whereby known focus servo method and tracking servo method can be employed, and therefore, an interference pattern can be formed in a specified region of an optical recording medium in a stable manner.

Further, the polarizing beam splitter of the present invention can be formed as a thin element despite of the effective area for an incident light while a large beam separation angle for a P polarized light and an S polarized light can be obtained, and a stable beam separation angle can be realized.

Further, when the polarizing beam splitter of the present invention is used as a polarizing beam splitter of an optical data recording/reproducing device for recording an interference pattern in an optical recording medium and for reproducing the data recorded as an interference pattern in the optical recording medium, the optical data recording/reproducing device can be of a small size, and stable recording and reproducing operations can be obtained.

The entire disclosures of Japanese Patent Application No. 2002-348250 filed on Nov. 29, 2002 and Japanese Patent Application No. 2002-348251 filed on Nov. 29, 2002 including specifications, claims, drawings and summaries are incorporated herein by reference in their entireties.

What is claimed is:

1. A phase plate, comprising:
   a polymer liquid crystal film held between transparent substrates, wherein
   the polymer liquid crystal film is parted spatially in the region, into which an incident light of wavelength λ enters, so that the light transmitting the phase plate assumes a different state of polarization depending on an aligning direction of the molecules of the polymer liquid crystal film,
   the phase plate comprises a transparent substrate having a surface on which a first polymer liquid crystal film whose molecules are aligned in a specified direction with respect to its surface, is formed in a first spatially parted region and another transparent substrate having a surface on which a second polymer liquid crystal film whose molecules are aligned in a specified direction different from that of the former polymer liquid crystal film with respect to its surface, is formed in a second spatially parted region, and
   the transparent substrates are laminated so that the region of the first polymer liquid crystal film and the region of the second polymer liquid crystal film are not overlapped with each other in plane view.

2. The phase plate according to claim 1, wherein the first and second polymer liquid crystal films comprises two polymer liquid crystal films having a retardation value of $(m+\frac{1}{2}) \times \lambda$ (where m is zero or an integer of positive sign) with respect to the incident light of wavelength λ and having molecules aligned uniformly with respect to the surfaces of the transparent substrates wherein aligning directions of the molecules are parted spatially in the first and second polymer liquid crystal films with a specified relative angle.

3. The phase plate according to claim 2, wherein the specified angle is 45°.

4. The phase plate according to claim 1, wherein the polymer liquid crystal films formed on the two transparent substrates are bonded by a homogeneous refractive index transparent material.

5. The phase plate according to claim 4, wherein an organic birefringent film is held in a layer of the homogeneous refractive index transparent material, each of the two polymer liquid crystal films has a retardation value of $(m_1+\frac{1}{2})\times\lambda$ (where $m_1$ is zero or an integer of positive sign) with respect to incident light of wavelength $\lambda$, the organic birefringent film has a retardation value of $(m_2+\frac{1}{2})\times\lambda$ (wherein $m_2$ is zero or an integer of positive sign) with respect to the incident light of wavelength $\lambda$, and the aligning directions of molecules of the organic birefringent film are uniform in a direction different from the aligning directions of the polymer liquid crystal films.

6. An optical data recording/reproducing device for recording in a optical recording layer of a disk-like optical recording medium an interference pattern as data, formed by the interference of an object light and a reference light irradiated to the disk-like optical recording medium having said optical recording layer and a light reflection layer, and for reproducing the recorded data by irradiating a reproducing light to the recorded interference pattern, the optical data recording/reproducing device comprising:

a beam combining means for aligning into the same optical axis the optical axes of the object light and reference light incident into the optical recording medium and an objective lens allowing the object light and the reference light to pass through the optical recording layer in the optical recording medium and focusing them on the light reflection layer; and a phase plate comprising a transparent substrate having a surface on which a first polymer liquid crystal film whose molecules are aligned in a specified direction with respect to its surface, is formed in a first spatially parted region and another transparent substrate having a surface on which a second polymer liquid crystal film whose molecules are aligned in a specified direction different from that of the former polymer liquid crystal film with respect to its surface, is formed in a second spatially parted region, the phase plate being located in the optical path between the beam combining means and the optical recording medium and the transparent substrates are laminated so that the region of the first polymer liquid crystal film and the region of the second polymer liquid crystal film are not overlapped with each other in plane view.

7. The optical data recording/reproducing device according to claim 6, wherein data are recorded in the optical recording medium by parting light having a wavelength $\lambda$ emitted from a light source into a first linearly polarized light and a second linearly polarized light by means of a first polarizing beam splitter, irradiating the first linearly polarized light to a spatial light modulator to produce an object light carrying data, using the second linearly polarized light as a reference light, and combining the object light and the reference light so as to align into the same optical axis by a second polarizing beam splitter as a beam combining means, and the data recorded in the optical recording layer are reproduced as a data carrying light by irradiating a reproducing light being a linearly polarized light parted by the first polarizing beam splitter to the optical recording layer in the optical recording medium, wherein the first polarizing beam splitter and the second polarizing beam splitter are polarizing beam splitters provided with polarizing diffraction gratings for parting the transmitting light along polarization directions by diffracting first and second linearly polarized incident lights whose polarization directions are perpendicular to each other, and the diffraction gratings have diffraction characteristics that the polarization separation angle formed by the diffracted first linearly polarized light and the diffracted second linearly polarized light is larger than the inherent diffraction angle of the incident linearly polarized light.

8. The optical data recording/reproducing device according to claim 7, wherein each of the first and second polarizing beam splitters comprises a homogeneous refractive index transparent material having an averaged refractive index between an ordinary refractive index $n_o$ and an extraordinary refractive index $n_e$, which is filled in at least concave portions of a polymer liquid crystal layer having an ordinary refractive index $n_o$ and an extraordinary refractive index $n_e$ and having the cross-sectional shape of a saw-tooth-like form.

9. The optical data recording/reproducing device according to claim 7, wherein each of the first and second polarizing beam splitters comprises a first polarizing diffraction grating for diffracting only an incident light of first linearly polarized light and a second polarizing diffraction grating for diffracting only an incident light of second linearly polarized light, which are laminated.

10. The optical data recording/reproducing device according to claim 9, wherein each of the first and second polarizing diffraction gratings comprises a polymer liquid crystal layer having an ordinary refractive index $n_o$ and an extraordinary refractive index $n_e$ and having the cross-sectional shape of a saw-tooth-like form and a homogeneous refractive index transparent material having an ordinary refractive index $n_o$ or an extraordinary refractive index $n_e$, which is filled in at least concave portions of the polymer liquid crystal layer wherein the polymer liquid crystal layer comprises two polymer liquid crystal layers in which the aligning directions of the molecules in the layers are perpendicular to each other.

* * * * *